(12) United States Patent
Plant

(10) Patent No.: US 10,582,004 B2
(45) Date of Patent: *Mar. 3, 2020

(54) RESILIENT MESSAGING INFRASTRUCTURE

(71) Applicant: International Business Machines Corporation, Armonk, NY (US)

(72) Inventor: Laurence J. Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,835

(22) Filed: Jul. 16, 2018

(65) Prior Publication Data

US 2018/0343315 A1     Nov. 29, 2018

Related U.S. Application Data

(63) Continuation of application No. 15/355,885, filed on Nov. 18, 2016, now Pat. No. 10,051,080, which is a continuation of application No. 13/940,840, filed on Jul. 12, 2013, now Pat. No. 9,525,585, which is a continuation of application No. 13/568,603, filed on Aug. 7, 2012, now Pat. No. 9,258,169.

(51) Int. Cl.
*H04L 29/08* (2006.01)
*H04L 29/06* (2006.01)
*H04L 12/58* (2006.01)

(52) U.S. Cl.
CPC .... *H04L 67/2861* (2013.01); *H04L 29/06047* (2013.01); *H04L 51/30* (2013.01); *H04L 67/1091* (2013.01); *H04L 67/42* (2013.01)

(58) Field of Classification Search
CPC .............. H04L 29/06047; H04L 51/30; H04L 67/1091; H04L 67/42
USPC ........................................................ 709/219
See application file for complete search history.

(56) References Cited

U.S. PATENT DOCUMENTS

| | | |
|---|---|---|
| 7,702,739 B1 | 4/2010 | Cheng et al. |
| 7,836,136 B1 | 11/2010 | Alfke |
| 7,849,140 B2 | 12/2010 | Abdel-Aziz et al. |

(Continued)

OTHER PUBLICATIONS

Mislove, Alan; POST: A Decentralized Platform for Reliable Collaborative Applications: Thesis; Dec. 2004; all pages (Year: 2004).*

(Continued)

*Primary Examiner* — Glenford J Madamba
(74) *Attorney, Agent, or Firm* — Steven M. Bouknight

(57) ABSTRACT

A first message resilience client device receives a message and a request to deliver the message, on behalf of a remote client/server-based client application that originated the message, to a client/server-based server application that provides outgoing client/server messaging services to the remote client/server-based client application that originated the message. In response to determining that the connection to the server device that executes the client/server-based server application is not currently possible with any available connection, the message is stored locally for one of later delivery to the client/server-based server application and propagation of the message to another message resilience client device on behalf of the remote client/server-based client application.

15 Claims, 11 Drawing Sheets

(56) References Cited

U.S. PATENT DOCUMENTS

| | | |
|---|---|---|
| 9,258,169 B2 | 2/2016 | Plant |
| 9,525,585 B2 | 12/2016 | Plant |
| 2011/0276636 A1* | 11/2011 | Cheng .................. H04L 69/18 709/206 |
| 2017/0070592 A1 | 3/2017 | Plant |

OTHER PUBLICATIONS

Alan E. Mislove, POST:A Decentralized Platform for Reliable Collaborative Applications, Thesis, Dec. 2004, pp. i-70, Rice University, Houston, TX.

United States Patent and Trademark Office, Office Action for U.S. Appl. No. 13/568,603, dated Apr. 9, 2015 pp. 1-24, Alexandria, VA, USA.

United States Patent and Trademark Office, Notice of Allowance for U.S. Appl. No. 13/568,603, dated Oct. 13, 2015 pp. 1-19, Alexandria, VA, USA.

United States Patent and Trademark Office, Office Action for U.S. Appl. No. 13/940,840, dated Aug. 14, 2015, pp. 1-29, Alexandria, VA, USA.

United States Patent and Trademark Office, Office Action for U.S. Appl. No. 13/940,840, dated Feb. 12, 2016, pp. 1-33, Alexandria, VA, USA.

United States Patent and Trademark Office, Notice of Allowance for U.S. Appl. No. 13/940,840, dated Aug. 23, 2016, pp. 1-23, Alexandria, VA, USA.

United States Patent and Trademark Office, Office Action for U.S. Appl. No. 15/355,885, dated Oct. 13, 2017, pp. 1-27, Alexandria, VA, USA.

United States Patent and Trademark Office, Notice of Allowance for U.S. Appl. No. 15/355,885, dated Apr. 10, 2017, pp. 1-8, Alexandria, VA, USA.

* cited by examiner

RESILIENT MESSAGING INFRASTRUCTURE

BACKGROUND

The present invention relates to messaging infrastructures. More particularly, the present invention relates to a resilient messaging infrastructure.

In client-server communication implementations of messaging services, each user accesses a messaging client (such as an e-mail client, a browser, an instant messaging client, or a short message service (SMS) client) on a client device to create and send a message to an intended recipient. The messaging client sends the message to a message server associated with the messaging client (e.g., an email server, a web server, an instant messaging server, a short message service center (SMSC), respectively). The message server in turn sends the message to a similar messaging client on a client device of the intended recipient.

SUMMARY

A method includes receiving, at a first message resilience client device from a second message resilience client device, a message and a request to deliver the message on behalf of a remote client/server-based client application that originated the message to a client/server-based server application that is executed by a server device and that provides outgoing client/server messaging services to the remote client/server-based client application that originated the message; and storing, in response to determining that delivery of the message as requested on behalf of the remote client/server-based client application to the server device that executes the client/server-based server application is not currently possible via any available connection, the message locally for one of later delivery to the client/server-based server application and propagation of the message with the request to deliver the message to at least one other message resilience client device on behalf of the remote client/server-based client application.

A system includes a memory and a processor programmed to: receive, at a first message resilience client device from a second message resilience client device, a message and a request to deliver the message on behalf of a remote client/server-based client application that originated the message to a client/server-based server application that is executed by a server device and that provides outgoing client/server messaging services to the remote client/server-based client application that originated the message; and store, in response to determining that delivery of the message as requested on behalf of the remote client/server-based client application to the server device that executes the client/server-based server application is not currently possible via any available connection, the message locally in the memory for one of later delivery to the client/server-based server application and propagation of the message with the request to deliver the message to at least one other message resilience client device on behalf of the remote client/server-based client application.

A computer program product includes a computer readable storage medium having computer readable program code embodied therewith, where the computer readable program code when executed on a computer causes the computer to: receive, at a first message resilience client device from a second message resilience client device, a message and a request to deliver the message on behalf of a remote client/server-based client application that originated the message to a client/server-based server application that is executed by a server device and that provides outgoing client/server messaging services to the remote client/server-based client application that originated the message; and store, in response to determining that delivery of the message as requested on behalf of the remote client/server-based client application to the server device that executes the client/server-based server application is not currently possible via any available connection, the message locally for one of later delivery to the client/server-based server application and propagation of the message with the request to deliver the message to at least one other message resilience client device on behalf of the remote client/server-based client application.

DETAILED DESCRIPTION

Figure 1:
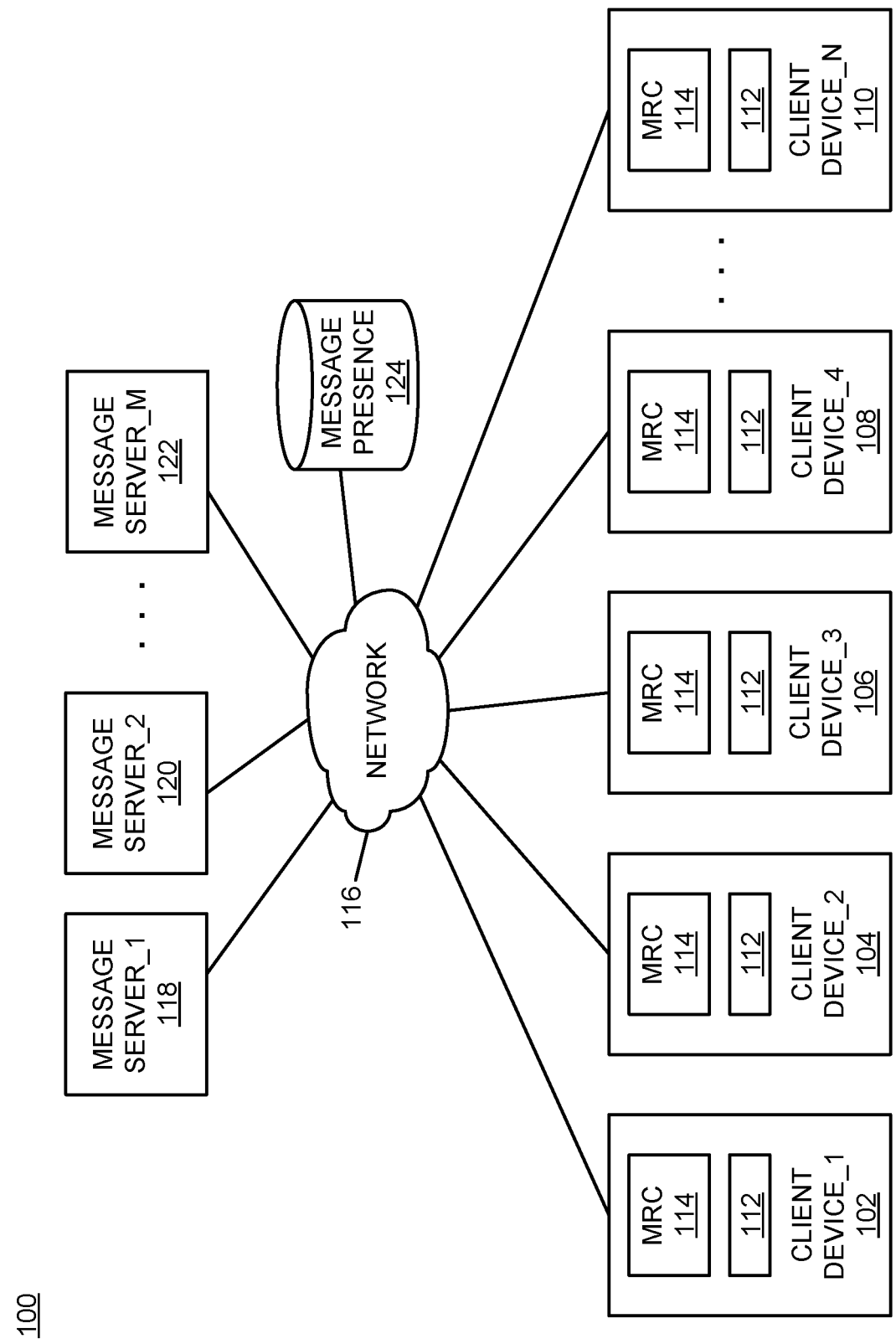
FIG. 1 is a block diagram of an example of an implementation of a system for an automated resilient messaging infrastructure according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a resilient messaging infrastructure. The present technology allows client-server-based communication devices to directly communicate with one another without requiring infrastructure devices (e.g., base stations for cellular devices, wireless fidelity (Wi-Fi) hotspots for Wi-Fi devices, etc.) to facilitate the inter-device communications. Unmodified messaging clients on the respective client devices may send messages directly to each other, without the messages first having to pass through one or more message servers. A client device may request one or more other client device(s) to act as a resilient proxy client device to deliver a message on behalf of the requesting client device. Any resilient proxy client device, termed herein as a message resilience proxy (MRC) device, may further transmit the message to other resilient proxy client devices (peer MRCs) that come into proximity of the respective resilient proxy client device, and this processing may continue until the message is finally delivered by one of the resilient proxy client devices to the target server application/device. Accordingly, the present technology facilitates a viral form of distribution of messaging directly between client devices and delivery of the messaging on behalf of the originating/requesting client device. Once a message is delivered, subsequent resilient proxy client devices that attempt to deliver the message may be notified of the successful delivery by another resilient proxy client device and the subsequent resilient proxy client devices may delete the locally-stored message. As such, the present subject matter creates a resilient messaging infrastructure.

The resilient messaging infrastructure described herein enables users of client-server messaging services to continue to send and receive messages when the message server or access to the message server is unavailable. The present subject matter may also reduce latency of message services based upon a client-server architecture, as described in more detail below.

The present technology allows messaging to be piggy-backed from a source client device (originating client device or a source resilient proxy client device) onto another target resilient proxy client device, and for this piggy-backed messaging to be propagated to other devices. The messages may be propagated when the respective source client device is momentarily in proximity with the target resilient proxy client device (e.g., Bluetooth® connection) or when the devices are connected to a common network or communication platform. If the target resilient proxy client device should come into communication with a functional cellular tower or wireless access point, or is presently in communication with a satellite, the respective target resilient proxy client device may deliver the message on behalf of the originating/source client device or may further propagate the message to peer MRCs with which it comes into contact/communication.

It should be noted that though the message may ultimately be delivered to a device that utilizes the same host communications platform/technology as the requesting client device (e.g., for text messaging), the message delivery from the resilient proxy client device is performed using a host communications platform/technology of the resilient proxy client device. The host communications platform/technology of the resilient proxy client devices may also be the same or different from the host communications technology of the originating client device. For example, the requesting client device may be a cellular device and the resilient proxy client device may be a Wi-Fi device or a satellite-based communication device. As such, if a resilient proxy client device that is requested to deliver a message is presently connected to that device's respective host communications platform, that resilient proxy client device may deliver the message at the time of the request (at least to an intermediate infrastructure server such as a short message service center (SMSC) or other device). Alternatively, where the respective resilient proxy client device's host communications platform is unavailable, the resilient proxy client device may store the message for later delivery and/or further distribution to other resilient proxy client devices, and may defer the attempted delivery of the message until the respective server device's host communications platform device is available to deliver the message.

As such, rather than utilizing message-originating client device host infrastructure devices (e.g., servers) and host technology of the requesting client devices (e.g., cell towers for cellular devices, wireless fidelity (Wi-Fi) hotspots for Wi-Fi devices, etc.) as the only means of communication, the present technology enables messaging across multiple client/host platforms and technologies. Accordingly, the messaging across the multiple client host platforms and technologies creates a resilient messaging infrastructure that is not dependent on the host communication technology of the client device that originates a message.

The present technology may be utilized to establish direct routes between messaging clients deployed in a client-server architecture. For example, where infrastructure devices (e.g., cell towers or wireless fidelity (Wi-Fi) hotspots) are inoperative or bandwidth limitations via certain technology infrastructure devices prevent timely communication, client communication devices may communicate directly with one another to act as messaging proxies to deliver messages on behalf of one another. For example, where a cellular client device is unable to access a cellular host technology base station but is in close proximity to a satellite telephone, the cellular client device may send a message to the satellite telephone for delivery via a satellite host communications network accessible via the satellite telephone. Alternatively, where the cellular client device comes into proximity with another cellular client device that is also unable to access a host technology base station, either cellular client device may send a message to the other cellular client device for subsequent delivery if the other cellular client device comes into an area served by a host technology base station. As such, messages may be delivered on behalf of client devices using different host technology platforms (e.g., cell versus satellite), or the same technology platform from a different location at a different time. Utilizing the present technology, other client devices may act as messaging proxies for client devices that are unable to communicate or for which bandwidth is limited.

The term "host technology" and "host communication technology" as used herein represents the primary technology for which a communication device is developed (e.g., cellular technology for a cellular device, Wi-Fi technology for a Wi-Fi device, satellite technology for a satellite telephone, etc.). The term "message" refers to an asynchronous form of communication using information and communications technology (ICT). Example messages include e-mail messages, instant messages, short message service (SMS) messages, voice-over-Internet Protocol (VOIP) messages, and other forms of messaging. Communication client devices may include email devices, cellular telephones/tablets, wireless fidelity (Wi-Fi) devices, and other devices (e.g., pacemakers, etc.) and may include devices based upon different host communications technologies (e.g., cellular, satellite, etc.).

It should be noted that conception of the present subject matter resulted from recognition of certain limitations associated with client-server based messaging infrastructures and peer-to-peer messaging infrastructures that rely upon intermediate servers for connectivity. For example, it was observed that many people during the catastrophic natural events, such as earthquakes and tsunamis, had cellular telephones/tablets, wireless fidelity (Wi-Fi) devices, and pacemakers emitting records of heart activity with charged batteries (original charge or recharged using a vehicle charger). However, it was further observed that the cell towers/base stations and/or intermediate servers (e.g., wireless access points) or heart monitors, collectively the communication infrastructure, were disabled and that people could not communicate with one another to determine whether friends and family members were safe or were in need of assistance. It was additionally observed that individuals with charged and operable devices may have crossed paths with one another (e.g., a cell user in close proximity with a satellite telephone user), but that messaging between the respective devices was not possible because at least one of the devices relied upon an inoperable communication infrastructure device to communicate. It was determined that, in view of these observations, dependency on a message server creates a communications resiliency problem that arises when the message server in unavailable or when the network that provides access to the message server is unavailable. Further, because messaging between the respective devices was not possible, there was no operable way within previous systems and technology for people with charged and operable devices to propagate messages (e.g., emails, text messages, etc.) via these other devices that were presently or at some other point in time coming into communication with an infrastructure device capable of transmitting the message. It was further observed that typical approaches to increasing resiliency are to increase the number of network paths and message servers and/or distribute the message servers across different geographic locations. However, it was determined that this approach does not provide continuity of service when all servers are unavailable, or when the networks providing access to the servers are unavailable, or when the backhaul network connection (e.g., interconnections between distributed sites) between the user's site and the outside world is unavailable. It was further determined that, even where servers are in place and operational but latency issues exist, direct inter-client-device communication may avoid delays due to reliance on a backhaul or other connection. The present subject matter improves communication infrastructure by providing for a resilient messaging infrastructure, as described above and in more detail below. As such, improved communications may be obtained through the resilient messaging infrastructure described herein.

It should further be noted that messaging client applications do not need to be modified to implement the present technology. As described in more detail below, a message resilience client (MRC) is implemented that interfaces with the client applications on the client devices. The MRC is placed on the MRC device or in the network. The MRC acts as a resilient intermediary or proxy device/node between the client application and the message server. MRC modules of several peer MRC devices may collaborate to implement the resilient messaging infrastructure described herein. As such, multiple client devices that implement the MRC module may form a network of MRC devices that work together to assist with message delivery. Accordingly, the network of MRC devices form a collection of peer MRC devices.

The MRC may access messages being sent by a client application (or that are to be delivered on behalf of a client application at a different client device) and analyze the messages from the source client application (e.g., the sending party) to identify the receiving party(ies) (e.g., person or people to whom the message is to be delivered). The MRC may then use an alternate architecture or communications strategy to the host client-server architecture to store and forward messages to the receiving party(ies) device. Examples of alternatives to client-server are point-to-point (P2P) for file sharing and session initiation protocol (SIP) for control of communication sessions between devices such as file transfer or instant messaging to transfer messages between devices. The MRC may use presence information to establish accurate visibility of message status across the network. Upon successful delivery of the message to the target user/device, the MRC broadcasts notification of successful delivery to peer MRCs and to a presence information repository that is used to notify all other MRCs of other proxy client devices that the message has been delivered. In response to the notification via the presence information in the broadcast or in the repository, each MRC may delete their respective copy of the message.

Regarding access by the MRC to the messages being sent by a messaging client application, the MRC may perform deep packet inspection to intercept message traffic as it passes from the messaging client application toward the message server. Alternatively, the MRC may impersonate the message server to lead the messaging client application to release the message to the MRC. As another alternative, the MRC may inspect the outboxes of the messaging client application(s). Many other possibilities for access to the messages being sent by a client application are possible and all are considered within the scope of the present subject matter.

Regarding use of an alternate architecture or communications strategy to the host client-server architecture to store and forward messages to the receiving party(ies) device, where the recipient is currently able to be reached via the set of available network connections, the MRC may utilize P2P to deliver the message directly to the recipient's MRC (or may use SIP to establish a session between MRCs on the respective devices to transfer message content). Alternatively, where the recipient is currently unable to be reached, the MRC may store the message in one or more MRCs across the network for subsequent delivery to the recipient's MRC as soon as the recipient's device re-connects to the network. The recipient's MRC may deliver the message to the recipient's message client application by different methods, including writing directly to the message client inbox or by impersonating the message server. Other possibilities exist for message delivery to the recipient's message client application and all are considered within the scope of the present subject matter.

It should be noted that a source MRC (either at the message originator device or at a source proxy client device) does not prevent a message from being sent to a message server. The MRC allows the message to be delivered to the message server if a connection is presently available, which in normal operation will attempt to deliver the message to the recipient. Alternatively, where a connection is presently unavailable, the MRC performs message processing in conjunction with other MRCs to implement the resilient messaging infrastructure as described above and in more detail below.

Regarding message delivery to the recipient's messaging client application, if the recipient's MRC has already delivered the message to the recipient's messaging client application, a subsequent delivery attempt by the message server will be intercepted and acknowledged by the recipient's MRC to allow proper message processing (e.g., avoid retry attempts) by the message server so that the message server is notified that the message has been delivered. As such, from the perspective of the message server, the recipient's MRC behaves in the same way as the native messaging client application and the message server believes it has delivered the message to the native message client application. It should be noted that the subsequently-received message may be discarded by the recipient's MRC so that the recipient's messaging client application does not receive the same message twice.

As an alternative, if the recipient's MRC has not already delivered the message to the messaging client application, the delivery attempt by the message server will be successful, and the recipient's MRC will delete subsequent identical messages received from MRC peers at other proxy client devices to ensure the recipient's messaging client application does not receive the same message twice.

The MRC may access and simultaneously utilize all available network connections. For example, if the respective client device has personal area network connectivity (such as Bluetooth® or Infrared), the MRC may use these networks to connect with peer MRCs. If the device has satellite network connectivity, the MRC may use this network to connect with peer MRCs.

For example, in a scenario where a cellular network is unavailable, in a set of client devices linked via Bluetooth® with no other forms of network connection available, the MRC on each device may link to one or more of its peer MRCs via Bluetooth® to enable messages to be passed from one device to another and to be delivered to the respective recipient's client application if the recipient's device is connected via the Bluetooth® network. Alternatively, in a set of devices linked via Bluetooth® where one of the devices has satellite access, the MRC on the device with satellite access may connect to both its peer MRCs via Bluetooth® and remote MRCs via the satellite network to enable messages to be passed from one device to another within the pool and to external devices via the satellite connection. In this way, messages from devices without satellite connectivity may be delivered over the satellite network connection of one of the devices in the Bluetooth® network.

As described above, an additional issue may arise even when all networks and servers are available based upon messaging latency. For example, users may experience delays in message delivery due to a message having to traverse one or more backhaul network links. The MRC may improve latency in such situations by enabling messages to pass directly between devices via P2P or SIP sessions. As such, the technology described herein may be utilized to reduce messaging latency for functional networks.

It should be noted that messages reside on the MRC in a "store and forward" mode of operation as the device moves from one network to another. As such, the present technology also enables a roaming device to transport messages between networks that are not connected to each other.

In view of the description above and in more detail below, the present technology may be utilized to increase communication resiliency and reduce latency. Further, because of the design and integration of the MRC, no modification to client-server messaging services is required. Alternative forms of architectures and communications strategies (e.g., P2P file sharing, SIP for Session Control) may be utilized to facilitate MRC functionality. The present technology is applicable to multiple classes and types of devices, message services, and networks. The message may roam across disparate network types, both when the device is connected to two or more networks at once, and when the device is connected to two or more networks at different times, all while maintaining the integrity of the message. Availability of application programming interfaces (APIs) for the MRC may allow a developer of the client-server messaging service to seek programmable integration. Further, user control to set options may be implemented, such as enabling certain features of the present subject matter, configurability of an amount of storage that is allocated for message storage and forwarding of messages, and other configuration options as appropriate for a given implementation.

The resilient messaging infrastructure described herein may be performed in real time to allow prompt communication between devices that would otherwise only be able to communicate via a tower or server and to allow messaging piggy-backing to allow other devices to deliver messaging on behalf of devices that are unable to reach a cellular tower or intermediate server. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for an automated resilient messaging infrastructure. A client device_1 102, a client device_2 104, a client device_3 106, a client device_4 108 through a client device_N 110 each execute one or more client application(s) 112. The client applications 112 may include a web browser, an e-mail client, an instant messaging client, a short message service (SMS) client, or any other client/server messaging client as appropriate for a given implementation.

A message resilience client (MRC) 114 operates within each client device 102 through 110. As described above and in more detail below, the MRC module 114 provides message resiliency within the system 100 in the event of network infrastructure failure or latency.

Each of the client device 102 through 110 communicate via a network 116 with several other devices. The other devices include a message server_1 118, a message server_2 120 through a message server_M 122. The message server_1 118 through the message server_M 122 may include any device capable of providing data or services for consumption by a device, such as the client devices 102 through 110, via a network, such as the network 116. As such, the message servers 118 through 122 may include e-mail servers, instant messaging servers, short message service centers (SMSC), web servers, or any other server-side client/server-based application host device or other data server or service server device.

It should be noted that while the MRC module 114 is illustrated within FIG. 1 and the figures/examples that follow in association with the client devices 102 through 110 for ease of illustration and description purposes, the MRC module 114 may also be associated with the message server_1 118 through the message server_M 122 without departure from the scope of the present subject matter. As such, a variety of implementation possibilities exist to support a resilient messaging infrastructure. Accordingly, all such possibilities are considered within the scope of the present subject matter.

One or more message presence databases, represented generally as a message presence database 124, may be distributed throughout the communications infrastructure and may store presence information for each of the client devices 102 through 110 that is understood to include information regarding accessibility of the respective client devices 102 through 110 via the network 116. The message presence database 124 may be hosted by a presence server (not illustrated) or by one of the message servers 118 through 122, or on any other device, as appropriate for a given implementation.

As described in more detail below, the message presence database 124 may also store message delivery information termed herein alternatively as "message presence information" that supports the resilient messaging infrastructure described herein. Any client device that is attempting to deliver a message on behalf of another client device may generate message delivery information that identifies itself, the message (e.g., a message identifier), and the respective client device for which the message delivery attempt is being performed. Additionally, any client device that successfully delivers a message on behalf of another client device may post message delivery information, if that information does not already exist in the message presence database 124, and an additional delivery completion identifier to notify other client devices that the respective client device has delivered the message on behalf of the other client device. As such, any other client device 102 through 110 that is attempting to deliver a message may recognize that delivery has been completed by any other client device and may remove its respective message delivery information from the message presence database 124 and may remove the stored message from its internal storage.

As such, the message delivery information may include information that identifies messages that are in the process of attempted delivery by client devices other than the message originating device, as well as delivery confirmation information that identifies messages for which delivery has been completed by one of the respective client devices. MRCs may check to see if the message has already been delivered before accepting a request from another MRC to propagate the message. In this manner, the requesting MRC device may also be notified of a successful delivery even where that requesting MRC device is unable to currently access the message presence information.

As will be described in more detail below in association with FIG. 2 through FIG. 7D, the client devices 102 through 110 provide an automated resilient messaging infrastructure. The automated resilient messaging infrastructure is based upon recognition by the respective client devices 102 through 110 of an inability to communicate with its respective service device(s) (e.g., network infrastructure failure) or excessive latency associated with client/server-based communications (e.g., excessive backhaul delays). In response to such a recognition, a respective client device (as a message originator) may initiate a request to any other client device(s) to which a communication path exists (e.g., via Bluetooth®, local area network (LAN), personal area network (PAN), home area network (HAN), wireless fidelity (Wi-Fi) network, or other connection) to act as a message resilience proxy client device and deliver one or more messages on behalf of the requesting client device.

Any client device that receives such a request may receive and store the respective message(s) for attempted delivery as a message resilience proxy client device for the requesting client device. If the message resilience proxy client device is currently capable of communication with its respective message server (e.g., via a satellite connection), it may attempt delivery of the message(s) on behalf of the requesting client device at that time. Alternatively, if the message resilience proxy client device is not currently capable of communication with its respective message server, it may attempt delivery of the message(s) on behalf of the requesting client device at a later time.

It should be noted that the client devices 102 through 110 may be portable computing devices, either by a user's ability to move the respective device to different locations, or by the device's association with a portable platform, such as a plane, train, automobile, or other moving vehicle. It should also be noted that the client devices 102 through 110 may be any computing device capable of processing information as described above and in more detail below. For example, the client devices 102 through 110 may include devices such as a personal computer (e.g., desktop, laptop, tablet computing device, e-book reading device, etc.) or a handheld device (e.g., cellular telephone, smartphone, personal digital assistant (PDA), email device, music recording or playback device, tablet computing device, e-book reading device, etc.), a set top box (STB), or any other device capable of processing information as described above and in more detail below.

The network 116 may include any form of interconnection suitable for the intended purpose, including a private or public network such as an intranet or the Internet, respectively, including backhaul connections, direct inter-module interconnection, dial-up, wireless, or any other interconnection mechanism capable of interconnecting the respective devices.

Figure 2:
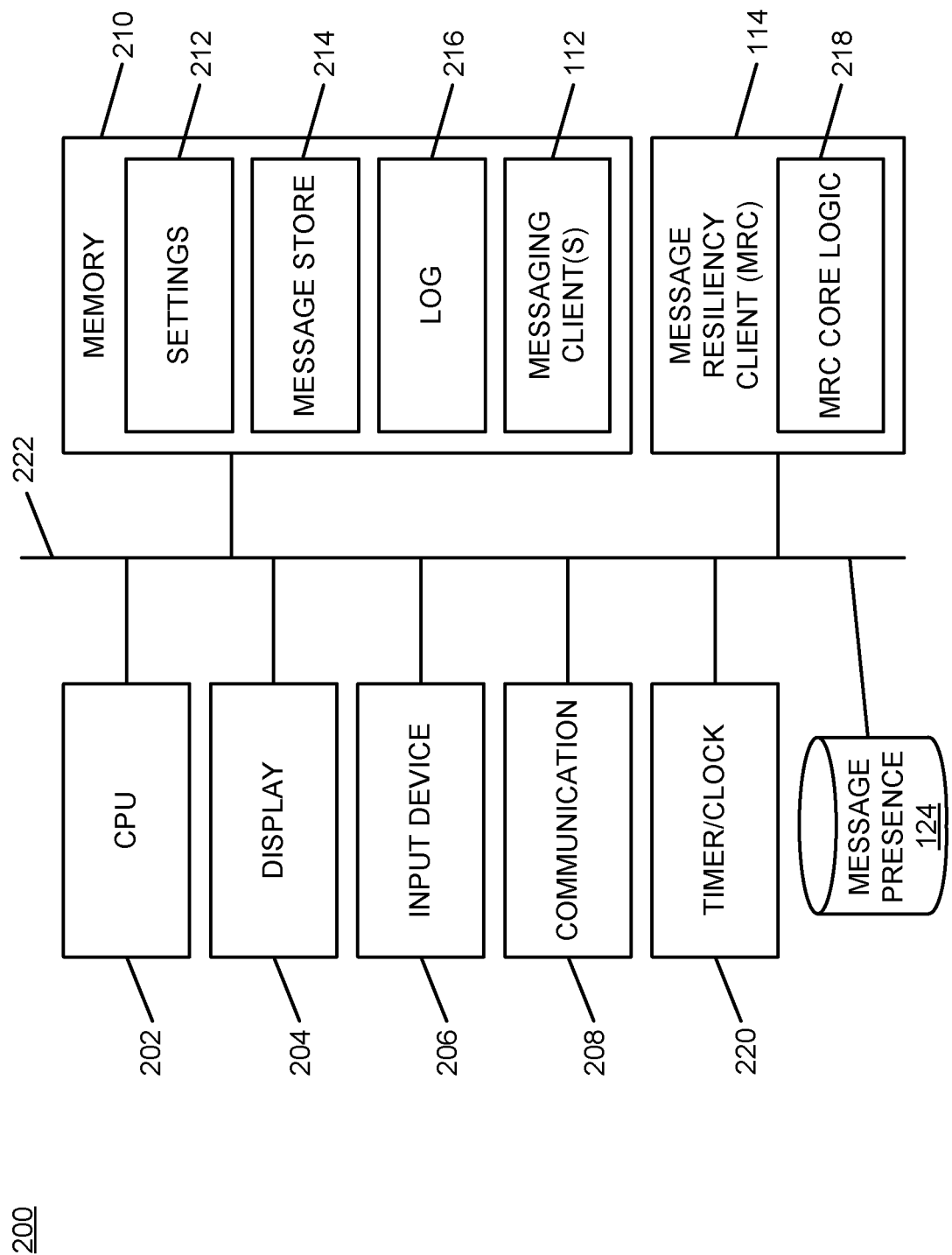
FIG. 2 is a block diagram of an example of an implementation of a core processing module capable of providing message resiliency services within an automated resilient messaging infrastructure according to an embodiment of the present subject matter.

FIG. 2 is a block diagram of an example of an implementation of a core processing module 200 capable of providing message resiliency services within an automated resilient messaging infrastructure. The core processing module 200 may be associated with either the client device_1 102 through the client device_N 110, or with the message server_1 118 through the message server_M 122, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of resilient messaging infrastructure services in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device (e.g., at a network-connected server) without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, including those described above and below, as appropriate for a given implementation.

A memory 210 includes a settings storage area 212 that stores configuration information and other information within the core processing module 200. The settings storage area 212 is associated with each MRC module 114 and may be utilized to configure thresholds for message proxy counts, message storage space allocations, message storage duration, and other configuration settings as appropriate for a given implementation. As such, the resilient messaging infrastructure described herein is highly configurable and flexible by design.

The memory 210 also includes a message store 214 that provides storage for messages either originated at the core processing module 200 or that are received to be forwarded on behalf of another processing device as part of the resilient messaging infrastructure services described herein. The memory 210 further includes a log storage area 216 that stores message tracking information associated with resilient messaging infrastructure services.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

The message resilience client (MRC) 114 is also illustrated again in FIG. 2 implemented as a device (and may be referred to alternatively as an MRC module 114). As described above and in more detail below, the MRC module 114 provides message resilience services for the core processing module 200. The MRC module 114 implements the automated resilient messaging infrastructure services of the core processing module 200. The MRC module 114 is shown to include MRC core logic 218 that implements the core processing for the MRC module 114. Additional internal components and details of the MRC module 114 are illustrated and described below in association with FIG. 3.

It should also be noted that the MRC module 114 may form a portion of other circuitry described without departure from the scope of the present subject matter. Further, the MRC module 114 may alternatively be implemented as an application stored within the memory 210. In such an implementation, the MRC module 114 may include instructions executed by the CPU 202 for performing the functionality described herein. The CPU 202 may execute these instructions to provide the processing capabilities described above and in more detail below for the core processing module 200. The MRC module 114 may form a portion of an interrupt service routine (ISR), a portion of an operating system, a portion of a browser application, or a portion of a separate application without departure from the scope of the present subject matter.

A timer/clock module 220 is illustrated and used to determine timing and date information, such as a message delivery time and date information. As such, the MRC module 114 may utilize information derived from the timer/clock module 220 for information processing activities, such as the resilient messaging infrastructure services.

For example, as described above and in more detail below, where a local MRC module 114 associated with a client device that has originated a message and determines that a connection to the respective server application is not available, the local MRC module 114 may propagate the locally-originated message to another MRC module 114 for delivery. The local MRC module 114 may then check the message presence database 124 in response to a new connection to the respective server application to determine whether message presence information has been created within the message presence database 124 by any other MRC module 114 to indicate that the other MRC module 114 is attempting to deliver, or has delivered, the message on behalf of the local client application 112. As such, the message presence information may include message propagation information to provide message delivery status for individual messages to other peer MRC devices. Where the message has already been delivered, the local MRC module 114 may request that the message presence database 124 delete the message presence information associated with that message. However, where no message presence information exists (e.g., the local MRC module 114 is the first device to attempt to create or update message presence information for the message), the local MRC module 114 may request that the message presence database 124 create message presence information to indicate that the originating MRC module 114 is delivering (has delivered) the message with a timestamp for storage duration of the created message presence information. As such, other MRC modules 114 that attempt to deliver the message during this configured time period may recognize that the message has already been delivered and the message presence database 124 may know how long to keep the message presence information available. Alternatively, the local MRC module 114 may use a configured time period to notify the message presence database 124 to delete the created message presence information. As another alternative, the message presence database 124 may be configured with a storage duration for message presence information that may be used, for example, when the message presence information is created by the MRC module 114 associated with the originating client application 112 to allow a configurable time period for notification to other MRC modules 114 that the message has been delivered by the originating MRC module 114. As described above, where the message is delivered by another MRC module 114, the MRC module 114 associated with the originating client application 112 may request that the message presence database 124 delete the message presence information in response to determining that another MRC module 114 has successfully delivered the message. Accordingly, many possibilities exist for configuration of durations of time for maintenance of message presence information within the message presence database 124, and all are considered within the scope of the present subject matter.

The message presence database 124 is also shown associated with the core processing module 200 within FIG. 2 to show that the message presence database 124 may be coupled to the core processing module 200 without requiring external connectivity, such as via the network 116.

The CPU 202, the display 204, the input device 206, the communication module 208, the memory 210, the MRC module 114, the timer/clock module 220, and the message presence database 124 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the message presence database 124 is illustrated as a separate component, information stored within the message presence database 124 may also be stored within the memory 210 without departure from the scope of the present subject matter. Accordingly, the core processing module 200 may take many forms and may be associated with many platforms.

Figure 3:
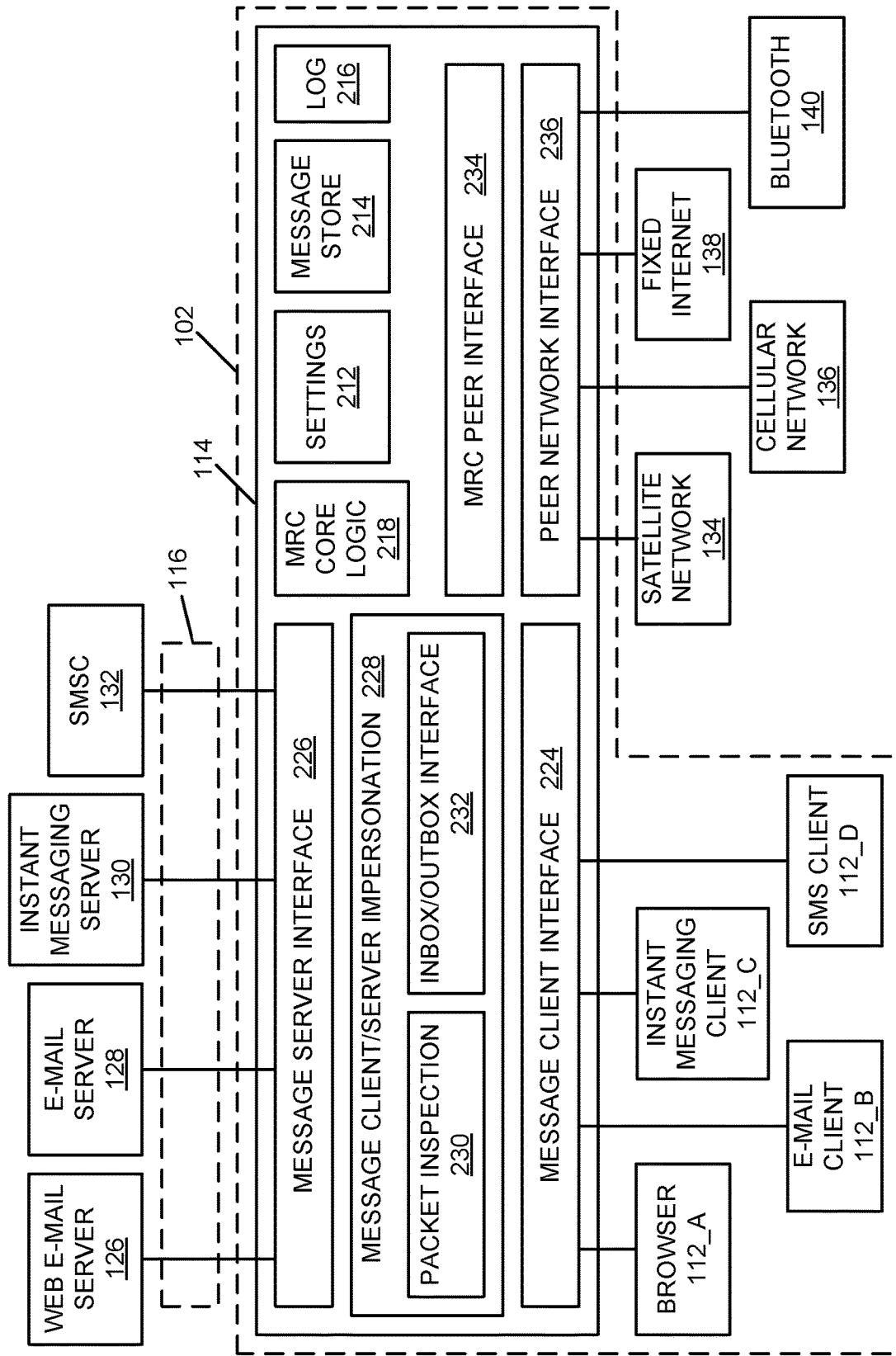
FIG. 3 is a logical block diagram of an example of an implementation of the system of FIG. 1 for automated resilient messaging infrastructure that illustrates more detail associated with an MRC module according to an embodiment of the present subject matter.

FIG. 3 is a logical block diagram of an example of an implementation of the system 100 of FIG. 1 for automated resilient messaging infrastructure that illustrates more detail associated with the MRC module 114. For ease of illustration purposes, only the client device_1 102 is illustrated within FIG. 3. For purposes of additional example, the client device_1 102 is illustrated to include several client applications that represent more specific implementations of the client application(s) 112. As such, a browser 112_A, an e-mail client 112_B, an instant messaging client 112_C, and a short message service (SMS) client 112_D are illustrated.

Within the MRC module 114 several additional components are illustrated and will be described in detail below. With respect to the browser 112_A, the e-mail client 112_B, the instant messaging client 112_C, and the SMS client 112_D, a message client interface module 224 is illustrated. The message client interface module 224 interacts with the respective message client either through application programming interfaces (APIs) or by appearing to be one or more message servers, with the assistance of other components as described in more detail below.

The network 116 is again illustrated interconnecting the client device_1 102 to several server devices that, for purposes of additional example, represent more specific implementations of the message server_1 118 through the message server_M 122. As such, a web e-mail server 126, an e-mail server 128, an instant messaging server 130, and a short message service center (SMSC) 132 are illustrated. A message server interface module 226 interacts with the respective message server devices either through APIs or by appearing to be one or more message clients, with the assistance of other components as described in more detail below.

A message client/server impersonation module 228 provides logic to drive transparent interaction between the MRC module 114 and the respective message clients, and between the MRC module 114 and the respective message servers. As such, in the absence of connectivity to one or more server applications (or during periods of high latency), the message client/server impersonation module 228 may impersonate one or more server applications to provide transparent message handling for one or more client applications, and for message distribution to other MRC modules 114 for attempted delivery to the respective server application(s). Further, the message client/server impersonation module 228 may impersonate one or more client applications of other devices for which one or more messages are proxied to provide transparent message handling for one or more server applications on behalf of the respective client application(s). The message client/server impersonation module 228 may further encrypt messages passing into and out of the respective clients to protect the messages as they pass through, and may cache the respective encrypted messages within the message store 214. As described above, MRC modules 114 of several client devices may collaborate to implement the resilient messaging infrastructure described herein. As such, multiple client devices that implement the MRC module 114 may form a network of MRC devices that work together to assist with message delivery.

A packet inspection module 230 analyzes messages/data packets being sent from the message client applications to the message servers to identify messages that may be delivered by the network of MRCs to an intended receiving device. An inbox/outbox interface module 232 may read the outbox of the message client applications for outgoing messages to identify messages that may be delivered by the network of MRCs to the receiving device, and may write to the inbox of the message client applications for incoming messages to deliver the messages.

An MRC peer interface module 234 uses point-to-point (P2P) or session initiation protocol (SIP) to communicate with peer MRCs, signal status of messages, and control message delivery between MRCs. A peer network interface module 236 implements logic to establish and maintain sequential and/or simultaneous connections with the set of communications networks as they are available. As such, as described above, where multiple network connections are available, the MRC module 114 may attempt to utilize all available network connections to deliver messages. Alternatively, even where no network connection is currently available, the MRC module 114 may utilize subsequently-available network to deliver messages.

The peer network interface module 236 is illustrated interconnecting with a satellite network 134, a cellular network 136, a fixed Internet 138, and a Bluetooth® connection 140. It should be noted that some or all of these networks/connections may form a portion of the network 116 without departure from the scope of the present subject matter. Alternatively, and/or additionally, certain of these networks/connections may form a portion of a local area network (LAN), a personal area network (PAN), home area network (HAN), wireless fidelity (Wi-Fi), or other network as appropriate for a given implementation. The MRC module 114 may utilize any of these networks/connections to communicate with other MRC peer devices within a network of MRC devices to perform the processing described above and in more detail below.

Figure 4:
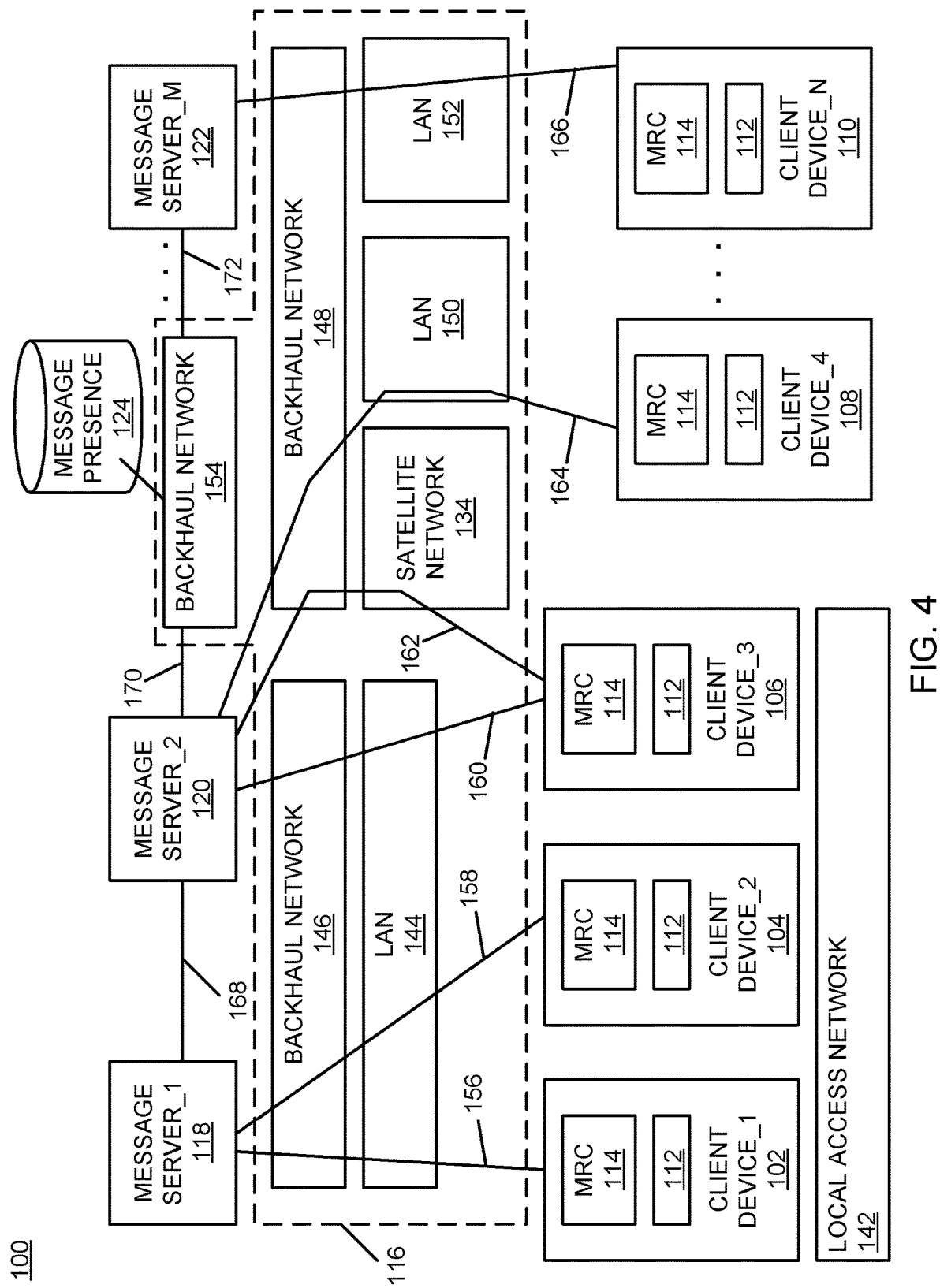
FIG. 4 is a logical block diagram of an example of an alternative implementation of the system of FIG. 1 for automated resilient messaging infrastructure that illustrates more detail of a network and messaging interconnections between client devices and messaging server devices according to an embodiment of the present subject matter.

FIG. 4 is a logical block diagram of an example of an alternative implementation of the system 100 of FIG. 1 for automated resilient messaging infrastructure that illustrates more detail of the network 116 and messaging interconnections between client devices and messaging server devices. Within FIG. 4, the message server_1 118 through the message server_M 122 are again illustrated as generalized messaging server devices for ease of illustration purposes. Additionally, a local access network 142 represents one or more of a LAN, PAN, Wi-Fi, Bluetooth® or other network/connection that may be utilized by the MRC module 114 of one or more of the client devices 102 through 110 to implement resilient messaging infrastructure services, as described in more detail below. Discussion of the resilient messaging infrastructure services between devices is described in more detail below in association with FIGS. 5A and 5B, while the present example in FIG. 4 illustrates certain initial conditions and connections to further facilitate the present description.

To illustrate initial client/server interconnection capabilities via the network 116, certain additional example components are illustrated. A LAN 144 is shown to interoperate with the backhaul network 146 to establish certain connections, as described in more detail below. Similarly, the satellite network 134 is again illustrated to interoperate with a different backhaul network 148. Additionally, a LAN 150 and a LAN 152 also interoperate with the backhaul network 148. The backhaul network 154 additionally facilitates access to the message presence database 124 and facilitates communication between the message server_2 120 through the message server_M 122.

Regarding initially-configured connections, a connection 156 supports client/server communications between the client device_1 102 and the message server_1 118 across the LAN 144 and the backhaul network 146. A connection 158 supports client/server communications between the client device_2 104 and the message server_1 118 across the LAN 144 and the backhaul network 146. A connection 160 supports client/server communications between the client device_3 106 and the message server_2 120 also across the LAN 144 and the backhaul network 146. A connection 162 supports client/server communications between the client device_3 106 and the message server_2 120 across the satellite network 134 and the backhaul network 148. A connection 164 supports client/server communications between the client device_4 108 and the message server_2 120 across the LAN 150 and the backhaul network 148. A connection 166 supports client/server communications between the client device_N 110 and the message server_M 122 across the LAN 152 and the backhaul network 148. A connection 168 supports communications between the message server_1 118 and the message server_2 120. A connection 170 supports communications between the message server_2 120 and the backhaul network 154. A connection 172 supports communications between the backhaul network 154 and the message server_M 122. It is understood that many other connections may exist and that the illustrated connections are representative and for purposes of illustration.

With the initial example connections described above, a detailed example of resilient messaging infrastructure processing will be described below in association with FIG. 5. It should be noted that the example within FIG. 5 illustrates one possible combination of failures of network infrastructure devices that interconnect client/server messaging components that result in an inability of client devices to communicate with message server devices. For example, a catastrophic failure of the network infrastructure devices may result from temporary or long-term power outage, broken infrastructure cabling, device failure, or any other factor. Additionally, as described above, excessive latency may result from multiple backhaul communications between multiple client devices and multiple server devices. As such, the present example is representative of the implementation opportunities for the present subject matter and many other possibilities exist. Accordingly all such possibilities are considered within the scope of the present subject matter.

Figure 5A:
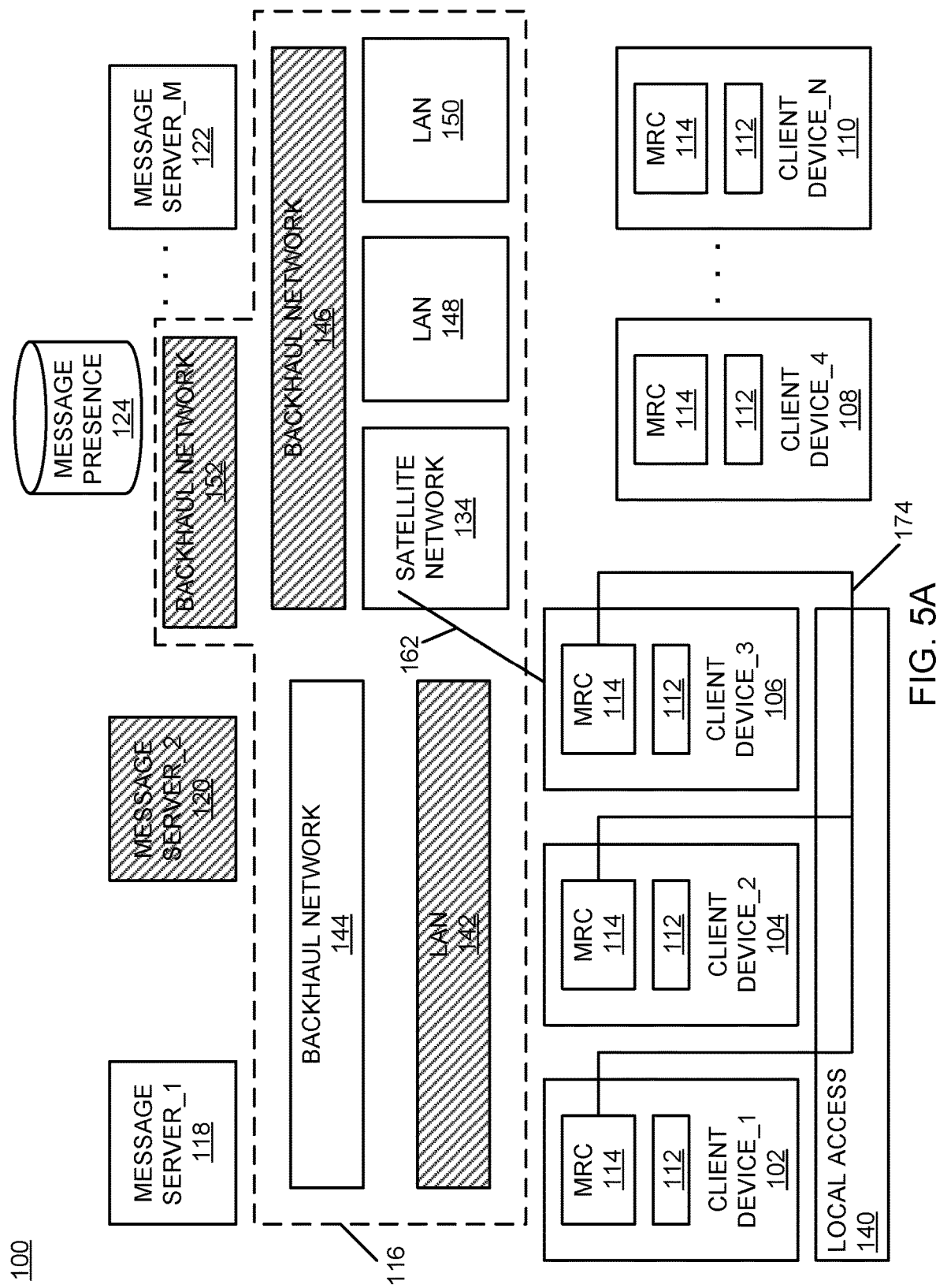
FIG. 5A is an illustration of initial processing of a time sequence of an example of an implementation of the system as described in FIG. 4 for automated resilient messaging infrastructure that illustrates message resilience clients performing resilient messaging infrastructure services and interconnection in response to network infrastructure failure and/or latency associated with a network and/or messaging servers according to an embodiment of the present subject matter.
Figure 5B:
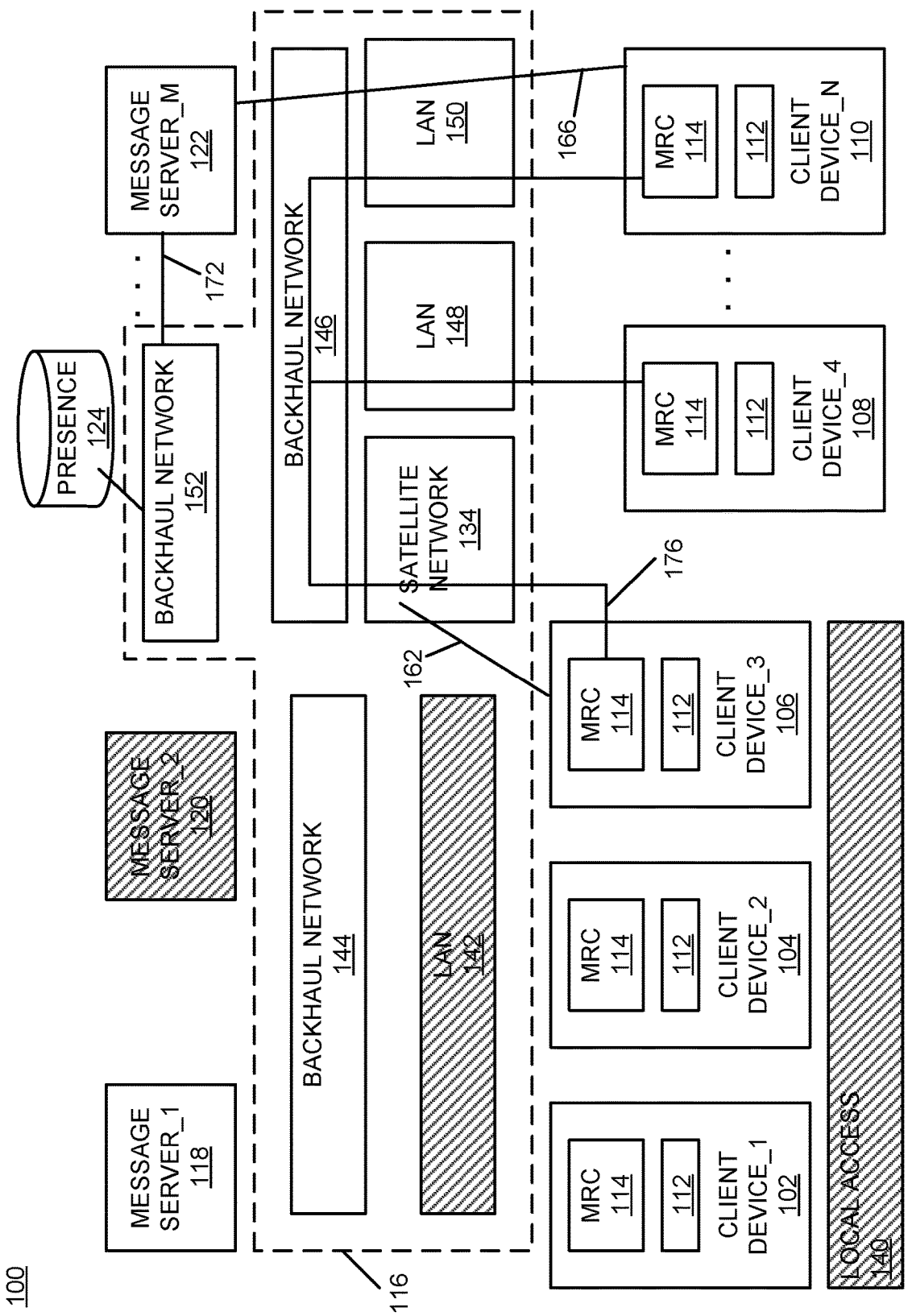
FIG. 5B is an illustration of additional processing of a time sequence of an example of an implementation of the system as described in FIGS. 4 and 5A for automated resilient messaging infrastructure that illustrates message resilience clients performing resilient messaging infrastructure services and interconnection in response to network infrastructure failure and/or latency associated with a network and/or messaging servers according to an embodiment of the present subject matter.

FIGS. 5A and 5B illustrate a time sequence of an example of an implementation of the system 100 as described in FIG. 4 for automated resilient messaging infrastructure that illustrates message resilience clients performing resilient messaging infrastructure services and interconnection in response to network infrastructure failure and/or latency associated with a network, such as the network 116, and/or messaging servers, such as the messaging servers 118 through 122. FIG. 5A represents initial processing for the time sequence and represents an initial example network infrastructure failure condition where certain network infrastructure and/or servers have failed, such as due to a power grid failure for portions of a power grid. It is understood that the example of FIGS. 5A and 5B represents but one possible failure condition and that many other possible failure conditions may occur within a given network infrastructure. Additionally, as described above, network latency conditions may result with or without a network infrastructure failure condition. As such, the present examples are representative only, and the present subject matter applies to any such conditions.

As can be seen from FIG. 5A, and as illustrated with cross-hatching in the drawing, the LAN 142, the message server_2 120, the backhaul network 152, and the backhaul network 146 have all failed (or are providing insufficient latency measures/throughput). As such, all of the connections 156 through 172 described above and illustrated within FIG. 4 no longer exist along the entire network route(s) between the respective client devices to the respective message server devices. For example, because of the failure of the LAN 142, the connection 156, the connection 158, and the connection 160 previously established by the respective client device to the respective message server devices cannot reach the backhaul network 144 from the client devices. It is understood that the connection 156 and the connection 158 still exist for purposes of the present example between the message server_1 118 and the backhaul network 144. Similar analysis may be applied to each other previous connection as a result of the failure of at least one of the components described above, and specific description is omitted for brevity. As such, certain portions of these connections may still exist between certain network components. However, to reduce complexity in the drawing, these connections are not illustrated within FIG. 5A for ease of illustration purposes with the exception of the connection 162 between the client device_3 106 and the satellite network 134 to assist with the present description of the present example.

Continuing with the present example, as can be seen from FIG. 5A, even though the client device_3 106 still has connectivity via the connection 162 to the satellite network 134, no client/server-based communications are possible via the network 116 at the current stage of processing between any client device and any message server device. Additionally, there is no connectivity between any device and the message presence database 124.

In response to determining that network connectivity is not possible (or that latency exceeds a configured level), the MRC module 114 of each of the client devices 102 through 110 attempts to establish a connection with a peer MRC module 114 of at least one other client device. As can be seen from FIG. 5A the client device_1 102, the client device_2 104, and the client device_3 106 are operably served by the local access 140, which again may include a LAN, PAN, HAN, Wi-Fi network, Bluetooth® connection, or other connectivity. Additionally, the local access 140 may be supported by an electric generator or may be situated on a separate portion of a power grid from the failed network components.

As such, a network connection 174 is established via the local access 140 between the client device_1 102, the client device_2 104, and the client device_3 106. Accordingly, the MRC modules 114 of the respective client devices may operate as a message resilience proxy client device for each of the other respective client devices. The MRC module 114 of each client device determines, such as via the respective packet inspection module 230 or the respective inbox/outbox interface module 232, whether any outgoing messages/packets are ready for delivery, but cannot currently be delivered. Any MRC module 114 that identifies a message (or packet) for delivery requests each other connected MCR module 114 to operate as a message resilience proxy client device to attempt to deliver those messages/packets and store the respective messages/packets for attempted delivery.

It should be noted that connectivity by the client device_3 106 via the satellite network 134 may reasonably result in a connection to one of the active message server devices by some network component and that the MRC module 114 of the client device_3 106 may utilize this active connection to deliver messages in real time on behalf of one or more of the client device_1 102 and the client device_2 104 to the active message server_1 118 with which these client devices are associated. For purposes of the present example, regardless of whether the MRC module 114 of the client device_3 106 successfully delivers the messages (or packets) concurrently with receipt, the message presence database 124 may be updated (either concurrently or at initial subsequent connectivity) by that MRC module 114 to document the respective message delivery. As such, when the respective client device_1 102 and/or the client device_2 104 establish a new connection, the respective MRC module 114 may determine the completed delivery of the message(s).

However, to further continue with the present example and to provide additional detail within the present example for delayed delivery of any stored messages, it will be assumed that the MRC modules 114 of the respective client devices were unable to deliver at least one message. For purposes of the present example, it is assumed that at least one message that is stored/proxied for delivery by the MRC module 114 of the client device_3 106 is destined for delivery to at least one of the client applications 112 of the client device_4 108 through the client device_N 110. The description of the present example will continue with FIG. 5B.

FIG. 5B represents additional processing of the time sequence of the system 100 as described in FIGS. 4 and 5A for automated resilient messaging infrastructure that illustrates message resilience clients performing resilient messaging infrastructure services and interconnection in response to network infrastructure failure and/or latency associated with a network and/or messaging servers. As can be seen from FIG. 5B, the local access 140 is cross-hatched to represent that this connection is no longer accessible to at least the client device_3 106. Such a situation may result, for example, from the user transporting the client device_3 106 from a location associated with the local access 140 to another location, or power loss associated with one or more devices that host the local access 140.

As can also be seen from FIG. 5B, connectivity via the backhaul network 146 and the backhaul network 152 have been re-established. Such a situation may result, for example, from a power grid associated with the backhaul network 146 and the backhaul network 152 coming back online. As such, interconnectivity using the resilient messaging infrastructure described herein between certain of the client devices and/or the message presence database 124 may now be established. Additionally, as a result of re-establishment of connectivity via the backhaul network 146 and the backhaul network 152, the connections 166 and 172 may also be re-established. As such, connectivity between the MRC module 114 of at least the client device_N 110 with the message server_M 122 may also be re-established.

Further, each of the MRC module 114 of each of the client device_3 106, the client device_4 108, through the client device_N 110 may also determine that they can communicate with one another via the respective satellite network 134, the LAN 148, and the LAN 150 as enabled by the backhaul network 146. In response to determining that connectivity to other MRC modules 114 is possible, each MRC module 114 may operate to establish a connection, represented within the present example by connection 176, for further distribution of proxied messages to attempt delivery to the ultimate destination of the respective messages via the resilient messaging infrastructure described herein.

As described above, for purposes of the present example it is assumed that at least one message that is stored/proxied for delivery by the MRC module 114 of the client device_3 106 is destined for delivery to at least one of the client applications 112 of the client device_4 108 through the client device_N 110. Additionally, the MRC module 114 of any of the client device_4 108 through the client device_N 110 may be storing proxy messages for delivery through the resilient messaging infrastructure described herein.

In response to establishing the connection 176, each of the respective MRC modules 114 attempts to deliver any stored/proxied messages to the other MRC modules 114 for further propagation and distribution throughout the resilient messaging infrastructure. It should additionally be noted that because the connection 172 has been re-established to the message server_M 122, any MRC module 114 that has a message destined for delivery to at least the client device_N 110 may forward that message to the message server_M 122 for conventional delivery to the client application 112 of the client device_N 110. It should additionally be noted that this delivery may be performed using the connection 176.

Additionally, because connectivity to the message presence database 124 has been re-established, each MRC module 114 may populate the message presence database 124 with message information stored within the respective log storage area 216 of the respective client device. As such, the message presence database 124 may be updated by any MRC module 114 to notify other MRC modules 114 of message delivery pendency, status, and delivery.

Further, because as described above at least one message that is stored/proxied for delivery by the MRC module 114 of the client device_3 106 is destined for delivery to at least one of the client applications 112 of the client device_4 108 through the client device_N 110, the respective receiving MRC module 114 may interact with the local client application 112 to effect delivery of the respective message(s). Delivery of the respective messages may be performed, for example, using the inbox/outbox interface module 232 to impersonate a message server for delivery of the respective messages to the respective inbox of the target client application 112.

In response to a successful delivery of any message to the target client application 112, the MRC module 114 (or the message server_M 122) may further update the message presence database 124 to indicate successful delivery of the message to the target client application 112. Contemporaneously or at a later time, each other MRC module 114 that has the respective delivered message stored may determine from the message presence database 124 that the message has been successfully delivered by another MRC module 114. In response to determining that the message has been successfully delivered by another MRC module 114, each other MRC module 114 that has the respective message stored may delete that message from its local message store 214.

As such, the processing for the time sequence illustrated within FIG. 5A and FIG. 5B show that the resilient messaging infrastructure provides a flexible and dynamic propagation of messages throughout a network of client/server-based devices in the absence of availability of their respective message servers. The resilient messaging infrastructure provided by the MRC modules 114 of the respective client devices establish ad-hoc connections in real time as they come into proximity of one another or are otherwise able to communicate with one another, either directly or via some form of interconnection. Messages may be proxied by multiple devices and each device will attempt to propagate proxied messages for ultimate delivery to target devices.

It should be noted, as described above, that the setting storage area 212 associated with each MRC module 114 may be utilized to configure thresholds for message proxy counts, message storage space allocations, message storage duration, and other configuration settings as appropriate for a given implementation. As such, the resilient messaging infrastructure described herein is highly configurable and flexible by design.

Figure 6:
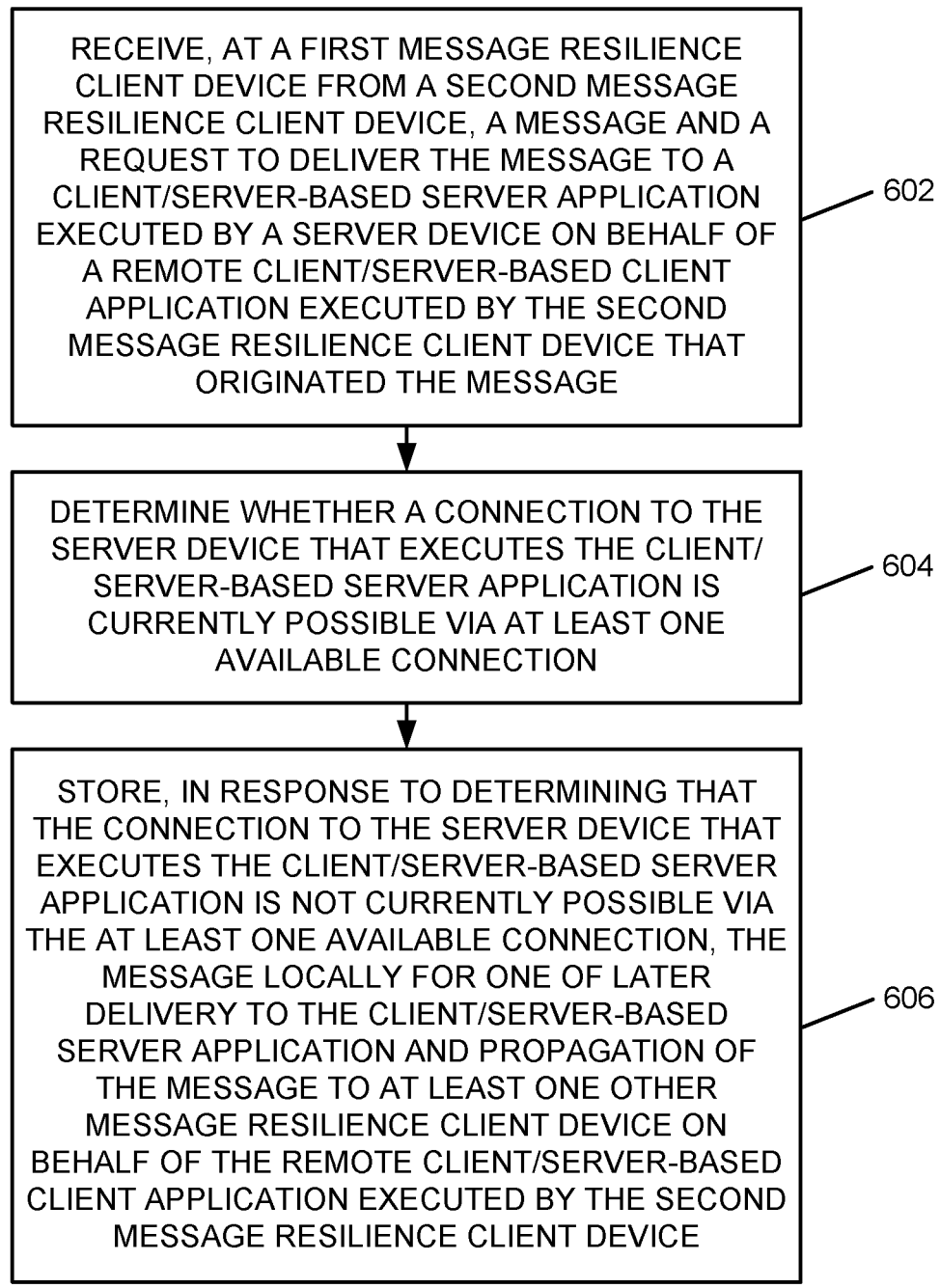
FIG. 6 is a flow chart of an example of an implementation of a process for automated resilient messaging infrastructure according to an embodiment of the present subject matter.
Figure 7A:
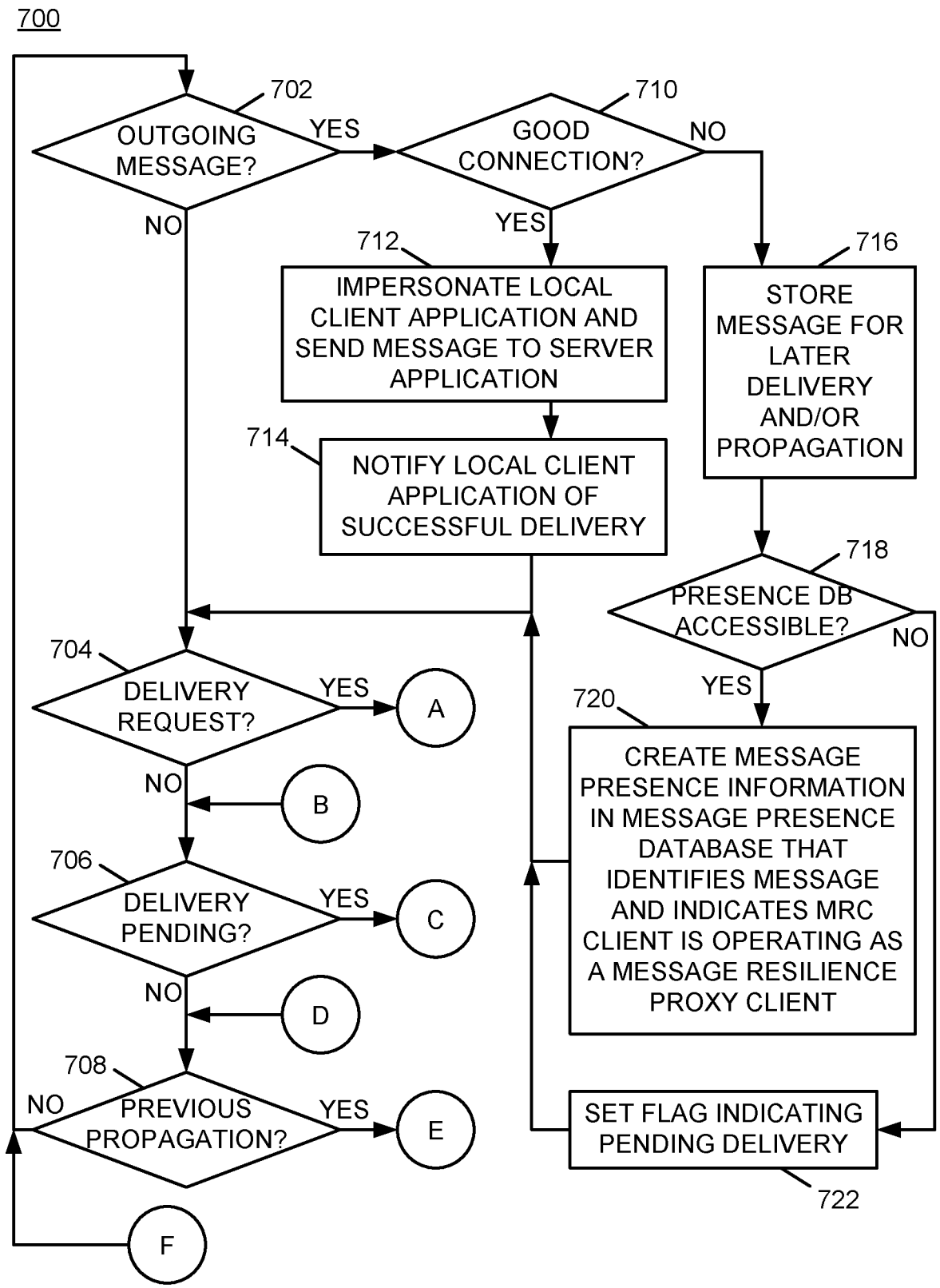
FIG. 7A is a flow chart of an example of an implementation of initial processing within a process for automated resilient messaging infrastructure processing according to an embodiment of the present subject matter.
Figure 7B:
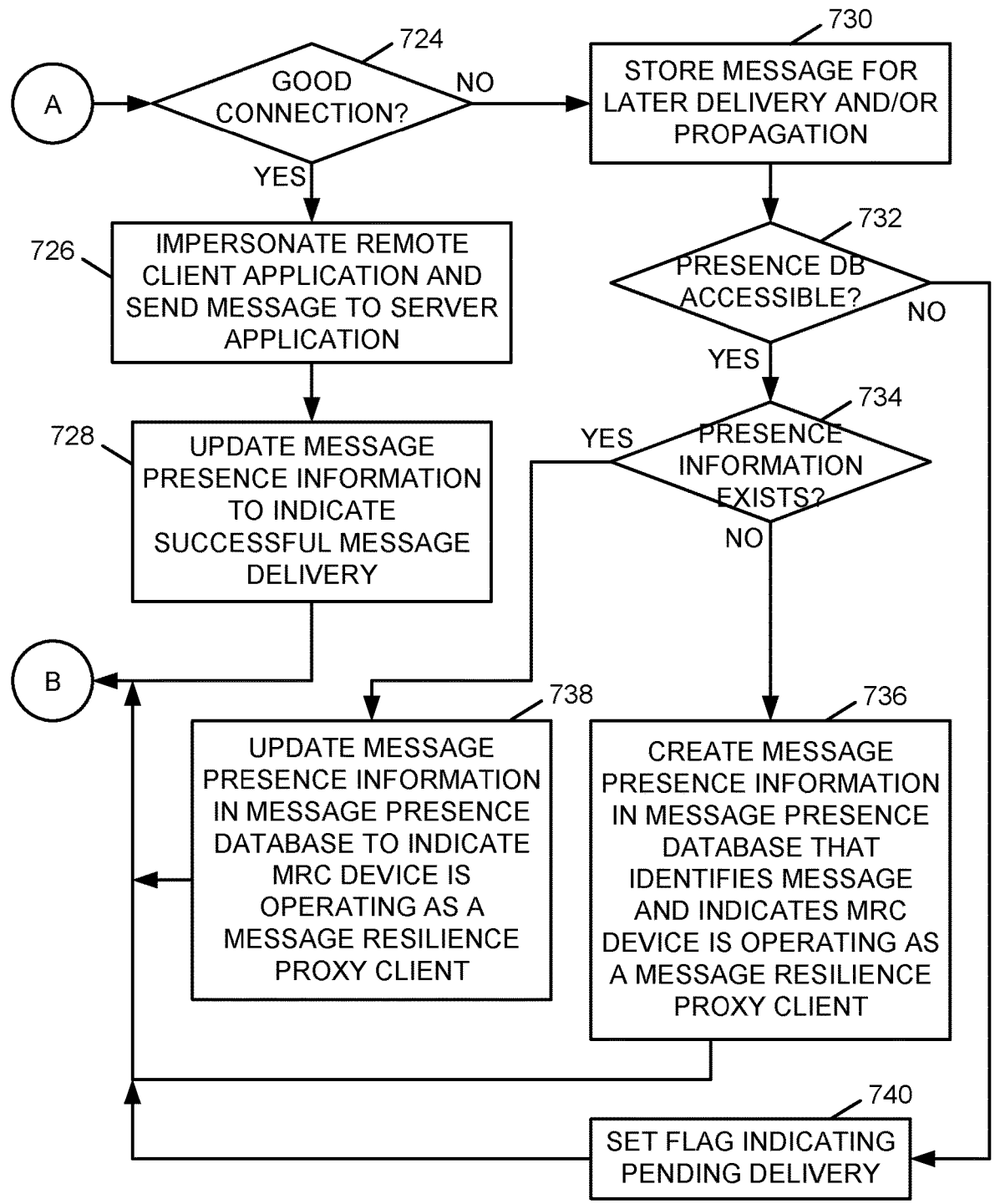
FIG. 7B is a flow chart of an example of an implementation of first additional processing within the process for automated resilient messaging infrastructure processing according to an embodiment of the present subject matter.
Figure 7C:
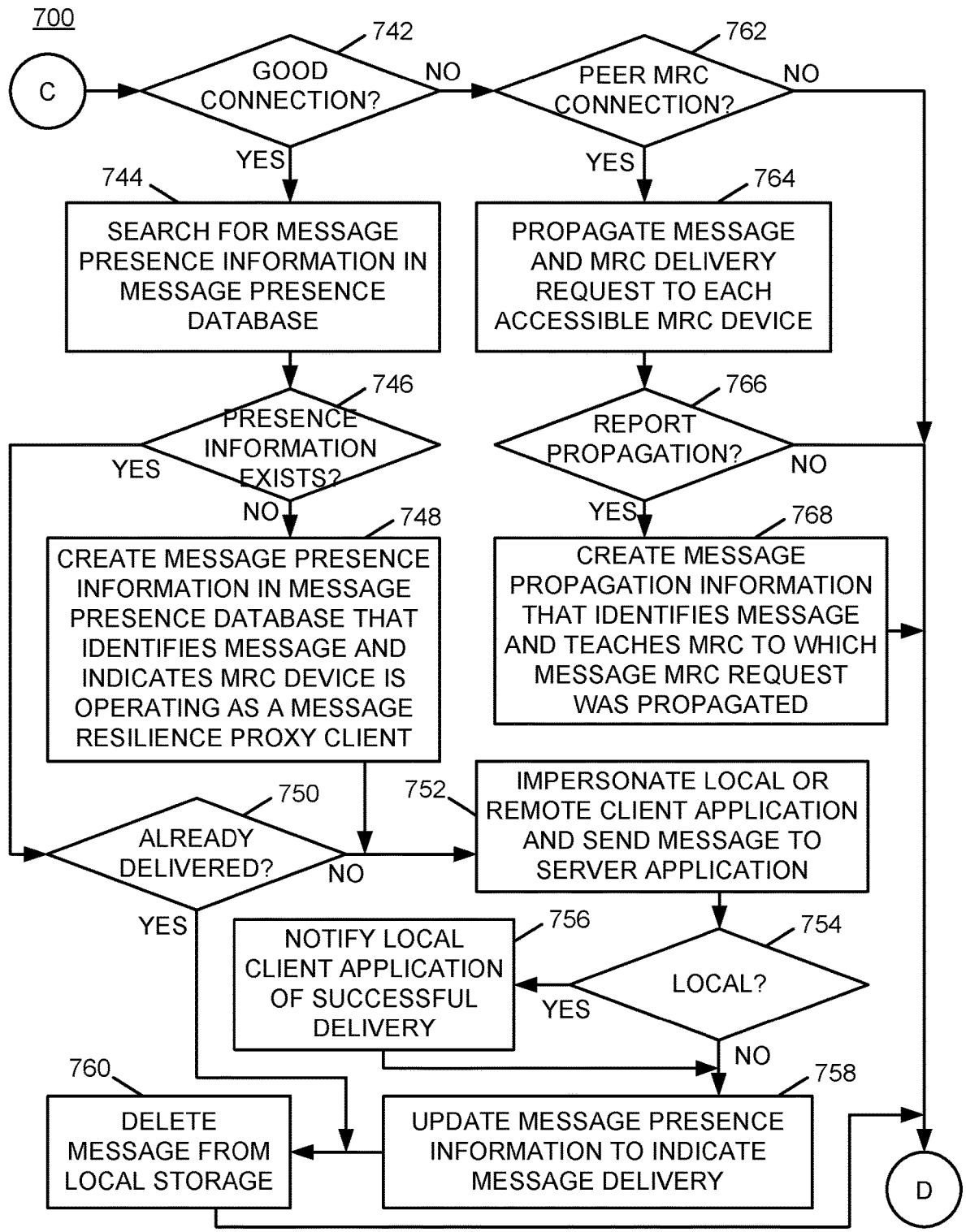
FIG. 7C is a flow chart of an example of an implementation of second additional processing within the process for automated resilient messaging infrastructure processing according to an embodiment of the present subject matter.
Figure 7D:
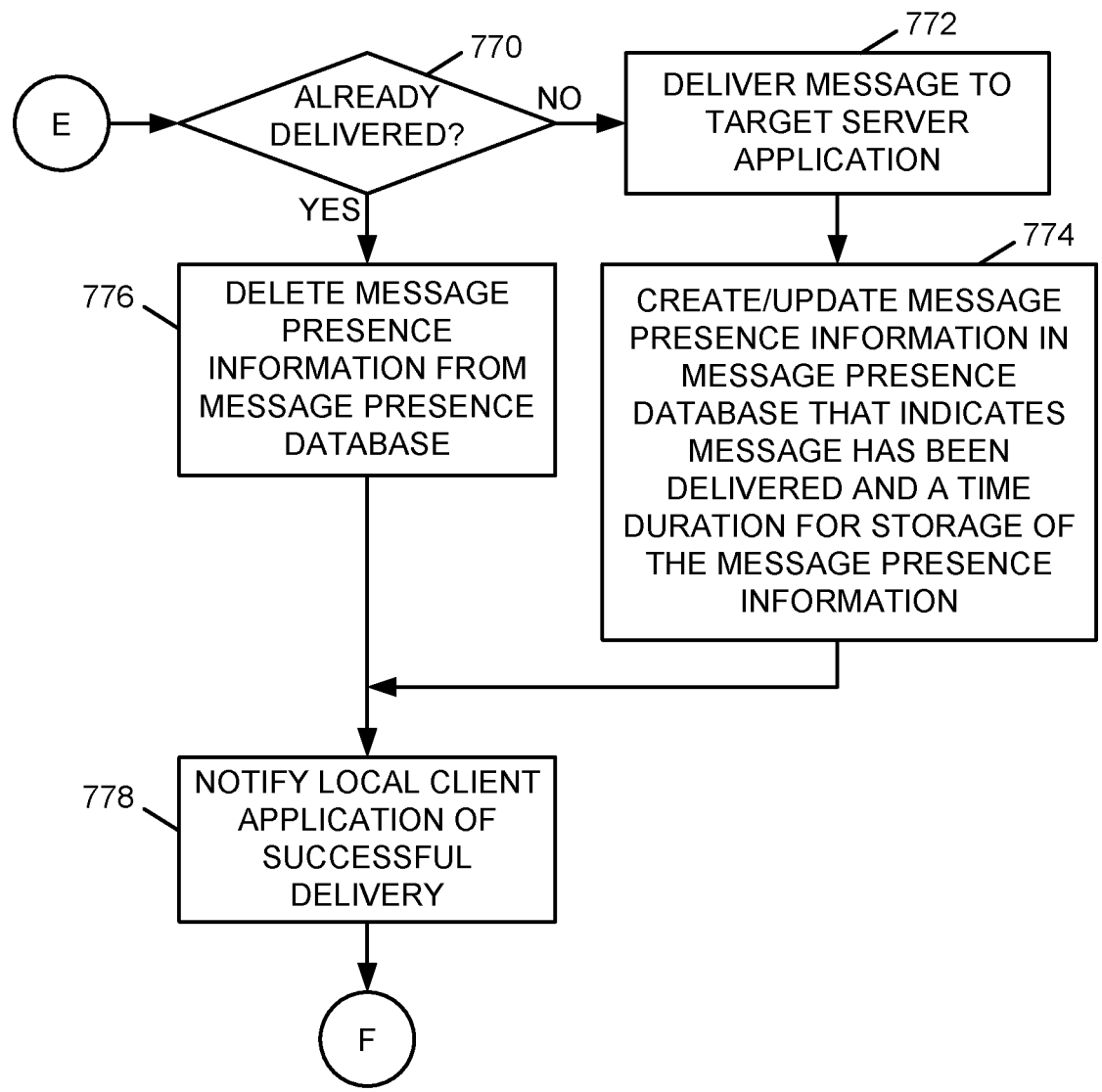
FIG. 7D is a flow chart of an example of an implementation of third additional processing within the process for automated resilient messaging infrastructure processing according to an embodiment of the present subject matter.

FIG. 6 through FIG. 7D described below represent example processes that may be executed by devices, such as the core processing module 200, to perform the automated resilient messaging infrastructure associated with the present subject matter. Many other variations on the example processes are possible and all are considered within the scope of the present subject matter. The example processes may be performed by modules, such as the MRC module 114 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for automated resilient messaging infrastructure. At block 602, the process 600 receives, at a first message resilience client device from a second message resilience client device, a message and a request to deliver the message to a client/server-based server application executed by a server device on behalf of a remote client/server-based client application executed by the second message resilience client device that originated the message. At block 604, the process 600 determines whether a connection to the server device that executes the client/server-based server application is currently possible via at least one available connection. At block 606, the process 600 stores, in response to determining that the connection to the server device that executes the client/server-based server application is not currently possible via the at least one available connection, the message locally for one of later delivery to the client/server-based server application and propagation of the message to at least one other message resilience client device on behalf of the remote client/server-based client application executed by the second message resilience client device.

FIGS. 7A-7D illustrate a flow chart of an example of an implementation of a process 700 for automated resilient messaging infrastructure processing. FIG. 7A illustrates initial processing within the process 700. At decision point 702, the process 700 begins higher-level iterative processing by making a determination as to whether a local outgoing client/server-based message has been originated by a local client application that is to be sent to a locally-targeted server application executed by a locally-targeted server device. For purposes of the present examples, server applications and server devices that are targeted for message delivery by local client applications associated with the MRC device that is executing the process 700 may be referred to using the "locally-targeted" adjective prefix, while server applications and server devices targeted by client applications associated with peer MCR devices may be referred to without an adjective prefix. A determination that a local outgoing client/server-based message has been originated by a local client application may be performed, for example, by packet inspection, such as via the packet inspection module 230. Alternatively, a determination that a local outgoing client/server-based message has been originated by a local client application may be performed by client outbox inspection, such as via the inbox/outbox interface module 232, as described above. Other alternatives exist for determining that a local client application has originated a message for delivery to a remote target server application, and all such alternatives are considered within the scope of the present subject matter. Processing associated with an affirmative determination at decision point 702 will be deferred and described in more detail below.

In response to determining at decision point 702 that a local client application has not originated a local outgoing client/server-based message to send to a locally-targeted server application executed by a locally-targeted server device, the process 700 makes a determination at decision point 704 as to whether a message delivery request has been detected and received from another peer MRC device. A received message delivery request may include a message and a request to deliver the message to a client/server-based server application executed by a server device on behalf of another client application executed by another MRC device that originated the message. Again, processing associated with an affirmative determination at decision point 704 will be deferred and described in more detail below.

In response to determining at decision point 704 that a message delivery request has not been detected and received from another peer MRC device, the process 700 makes a determination at decision point 706 as to whether a delivery of a message is pending. It should be noted that a pending delivery of the message may include a pending delivery of the message originated by a local client application or a pending proxy delivery of the message on behalf of another client application executed by another peer MRC device. As with the other higher-level processing described above, processing associated with an affirmative determination at decision point 706 will be deferred and described in more detail below.

In response to determining at decision point 706 that there is not a current pending delivery of a message, the process 700 makes a determination at decision point 708 as to whether the local MRC device that is executing the process 700 has previously propagated a message to another peer MRC device for delivery. It should be noted that a propagated message may include a message generated by a local client application or a pending proxy delivery of the message that was further propagated to a peer MRC device on behalf of another client application executed by another peer MRC device. Once again, processing associated with an affirmative determination at decision point 708 will be deferred and described in more detail below. As such, in response to determining that the local MRC device has not previously propagated a message to another peer MRC device for delivery, the process 700 returns to decision point 702 and iterates as described above.

Returning to the description of decision point 702 within FIG. 7A, in response to determining/detecting that a local client application has originated a local outgoing client/server-based message to send to a locally-targeted server application executed by a locally-targeted server device, the process 700 makes a determination at decision point 710 as to whether a connection to the locally-targeted server device that executes the locally-targeted server application is currently possible via any available connection. In response to determining that a connection to the locally-targeted server device that executes the locally-targeted server application is currently possible via at least one available connection, the process 700 impersonates the local client application and sends the message to the locally-targeted server application at block 712. At block 714, the process 700 notifies the local client application of successful delivery to the locally-targeted server application. The process 700 returns to the higher-level iterative processing, such as for example at decision point 704, or another processing location as appropriate for a given implementation, and iterates as described above.

Returning to the description of decision point 710, in response to determining that a connection to the locally-targeted server device that executes the locally-targeted server application is not currently possible via any available connection, the process 700 stores the message locally for later delivery to the locally-targeted server application and/or for propagation to another peer MRC on behalf of the local client application at block 716. At decision point 718, the process 700 makes a determination as to whether a message presence database, such as the message presence database 124, is currently accessible.

In response to determining that a message presence database is currently accessible, the process 700 creates message presence information within the message presence database at block 720. The message presence information identifies the message and indicates to other MRC devices that the local MRC device is operating as a message resilience proxy client device for the local client application to attempt to deliver the message to the locally-targeted server application on behalf of the local client application. It should be noted that by differentiating within the message presence information the MRC device from which a message is originated, other MRC peer devices that have current access to the respective message presence database may provide notifications of successful delivery directly to an MRC device that originated a message if the message-originating MRC device does not have current access to the respective message presence database.

In response to determining at decision point 718 that a message presence database is not currently accessible, the process 700 sets a flag to indicate that there is a pending message delivery at block 722. In response to either creating the message presence information within the message presence database at block 720, or in response to setting the flag to indicate a pending message delivery at block 722, the process 700 returns to the higher-level iterative processing, such as for example at decision point 704, or another processing location as appropriate for a given implementation, and iterates as described above.

Returning to the description of decision point 704 within FIG. 7A, in response to determining that a message delivery request has been detected and received from another peer MRC device, the process 700 transitions to the processing shown and described in association with FIG. 7B.

FIG. 7B illustrates a first additional portion of the example processing associated with the process 700 for automated resilient messaging infrastructure processing. At decision point 724, to initiate an attempt to perform a proxy delivery of the message in response to the request from the peer MRC device, the process 700 makes determination as to whether a connection to the server device that executes the target server application is currently possible via any available connection. In response to determining that a connection to the server device that executes the target server application is currently possible via at least one available connection, the process 700 impersonates the remote client application that originated the message and sends the message to the target server application at block 726.

It should be noted that the remote client application may be executed by the peer MRC device that initiated the request for the proxy delivery of the message. Alternatively, the remote client application may be executed by another peer MRC device further across an MRC network, and the peer MRC device that requested delivery by the local MRC device may have performed the service of propagating the message for delivery on behalf of the originating client application.

It should additionally be noted that the process 700 may further make a determination as to whether connectivity to a message presence database is currently available and may search for message presence information in the message presence database to determine whether the message has already been delivered by another MRC peer device prior to sending the message to the target server application at block 726. Examples of such processing are described in detail below in association with additional portions of FIG. 7B and FIG. 7C, respectively. For purposes of the present example and to alleviate complexity and redundancy within the drawing figures, it is assumed that connectivity to the appropriate message presence database is currently accessible by the local MRC device and that the message has not already been delivered by another peer MRC device for this branch of processing. It is understood that this portion of the process 700 may be updated similarly to the processing described in association with FIG. 7C below based upon the description herein.

As such, at block 728, the process 700 updates the message presence information within the message presence database to indicate successful message delivery by the local MRC device. The process 700 transitions back to the processing shown and described in association with FIG. 7A, such as for example at decision point 706 or another processing location as appropriate for a given implementation.

Continuing with the description of FIG. 7B and decision point 724, in response to determining that a connection to the server device that executes the target server application is not currently possible via any available connection, the process 700 stores the message for later delivery and/or propagation to another peer MRC device at block 730. At decision point 732, the process 700 makes a determination as to whether the appropriate message presence database is currently accessible.

In response to determining at decision point 732 that the message presence database is currently accessible, the process 700 makes a determination at decision point 734 as to whether message presence information exists for the message within the message presence database. In response to determining that message presence information does not exist for the message within the message presence database, the process 700 creates message presence information within the message presence database at block 736. Similarly to the description above, the message presence information identifies the message and indicates to other MRC devices that the local MRC device is operating as a message resilience proxy client device for the remote client application to attempt to deliver the message to the target server application on behalf of the remote client application.

In response to determining at decision point 734 that message presence information does exist for the message within the message presence database, the process 700 updates the message presence information to indicate to other peer MRC devices that the local MRC device is acting as message resilience proxy client for the message-originating remote client application at block 738.

Returning to the description of decision point 732, in response to determining that the message presence database is not currently accessible, the process 700 sets a flag to indicate a pending message delivery at block 740. In response to any of creating the message presence information within the message presence database at block 736, in response to updating the message presence information in the message presence database at block 738, or in response to setting the flag to indicate a pending message delivery at block 740, the process 700 returns to the higher-level iterative processing, such as for example at decision point 706, or another processing location as appropriate for a given implementation, and iterates as described above.

Returning to the description of decision point 706 within FIG. 7A, in response to determining that there is a current pending delivery of a message (e.g., such as a message originated by a local client application and processed in association with decision point 702 as described above, or in association with a message originated by a remote client application and processed in association with decision point 704, as also described above), the process 700 transitions to the processing shown and described in association with FIG. 7C.

FIG. 7C illustrates a second additional portion of example processing associated with the process 700 for automated resilient messaging infrastructure processing. It should be noted that, to reduce complexity within the drawing figures and to reduce redundancy among the various processing steps described in association with the process 700, it is assumed that the message presence database is accessible for the remainder of the processing described herein. Reference may be made to additional origins of processing described above for situations where the message presence database is not accessible.

At decision point 742, the process 700 makes a determination as to whether a new/good connection is available to the server device that executes the target server application. Processing for a negative determination at decision point 742 will be deferred and described in more detail below.

As such, in response to determining that a new/good connection is available to the server device that executes the target server application at decision point 742, the process 700 searches the message presence database for message presence information related to the message for which delivery is pending at block 744. It should be noted that the message for which delivery is pending may be a local client-originated message or a remote client-originated message.

At decision point 746, the process 700 makes a determination as to whether message presence information exists for the pending message within the message presence database. In response to determining that the message presence information does not exist for the pending message within the message presence database, the process 700 creates the message presence information within the message presence database that identifies the message and that indicates to other peer MRC devices that the local MRC device is operating as a message resilience proxy client to deliver the message on behalf of the originating client application at block 748.

In response to determining that the message presence information does exist for the pending message within the message presence database, the process 700 makes a determination at decision point 750 as to whether the message has already been delivered to the target server application. Processing associated with an affirmative determination at decision point 750 will be deferred and described in detail below. However, it should be noted that, where the determination that the message has already been delivered is made by the message-originating MRC device (e.g., the MRC device associated with the message originating client application), the message presence information within the message presence database may be updated to indicate a time duration for continued storage of the message presence information to allow sufficient time for other MRC devices to determine that the message has already been delivered to avoid repetitive and redundant deliveries of the message to the target server application. An example of such processing is illustrated and described below in association with FIG. 7D, and is omitted from FIG. 7C to reduce complexity and crowding within the drawing. However, it is understood that such processing to configure a time duration for continued storage of the message presence information after successful delivery forms a portion of the process 700. As an alternative, the message presence database may be configured with a continued storage duration for message presence information in response to successful message delivery to allow all devices, including the message-originating MRC device to determine that the message has been successfully delivered. Many alternatives exist for configuration of storage durations and limits for message presence information, and all such variations are considered to be within the scope of the present subject matter.

Returning to the description of decision point 750, in response to determining that the message has not already been delivered to the target server application, or in response to creating the message presence information in the message presence database at block 748 (which may also be assumed for purposes of the present example that no other MRC device has successfully created the message presence information for the particular message within the message presence database or successfully delivered the message to the target server application), the process 700 impersonates the respective local or remote client application and sends the message to the target server application at block 752.

At decision point 754, the process 700 makes a determination as to whether the delivered message was locally originated by a local client application. In response to determining that the delivered message was locally originated by a local client application, the process 700 notifies the local client application of successful delivery at block 756.

It should be noted that the message presence information within the message presence database is utilized to notify remote client applications of successful delivery of the message, whether the message was locally originated or remotely originated. As such, in response to either notifying the local client application of successful delivery at block 756 or in response to determining that the delivered message was not locally originated by a local client application at decision point 754, the process 700 updates the message presence information within the message presence database to indicate successful delivery at block 758.

It should further be noted that, for purposes of the present example, where the delivered message was locally originated by a local client application, the message presence information may also be utilized to notify the message presence database of a time frame/duration for which to maintain the message presence information for the delivered message by the local MRC device. As such, the message presence information may be maintained within the message presence database for a configurable duration of time to allow other MRC devices to determine that the message has already been delivered to avoid redundant and repetitive delivery of the message to the target server application, and the update of the message presence information at block 758 may include an indication by the local MRC device of a time duration for storage of the message presence information. As another alternative, the message presence database may be independently configured with a message presence information storage duration which may begin, for example, in response to notification of successful delivery of the message by any MRC device. Within any implementation, storage space within the message presence database may be managed by timely deletion of message presence information after successful delivery of messages to target server applications.

In response to updating the message presence information at block 758, or in response to determining that the message has already been delivered at decision point 750, the process 700 deletes the message from local storage associated with the MRC device at block 760. The process 700 returns to the higher-level processing described in association with FIG. 7A, such as at decision point 708 or other processing location as appropriate for a given implementation, and iterates as described above.

Returning to the description of decision point 742 within FIG. 7C, in response to determining that a new/good connection to the server device associated with the target server application is not currently available, the process 700 makes a determination at decision point 762 as to whether an alternative connection to any other MRC device is currently available. In response to determining that an alternative connection to at least one other MRC device is not currently available, the process 700 returns to the higher-level processing described in association with FIG. 7A, such as at decision point 708 or other processing location as appropriate for a given implementation, and iterates as described above. In response to determining that an alternative connection to at least one other MRC device is currently available at decision point 762, the process 700 propagates the message and the request to deliver the message to the target server application on behalf of the message-originating client application executed by the second message resilience client device to each other MRC device to which an alternative connection is determined to be currently available at block 764.

At decision point 766, the process 700 makes a determination as to whether to report the message resilience propagation of the message within message presence information at the message presence database. Message resilience propagation information may be utilized by the message presence database or other processing entity to report successful message delivery to the MRC devices to which the message was propagated, as appropriate for a given implementation. Alternatively, the respective MRC devices may determine from the message presence information that the message has been successfully delivered as alternatively described in association with the present example.

In response to determining at decision point 766 not to report the message resilience propagation of the message, the process 700 returns to the higher-level processing described in association with FIG. 7A, such as at decision point 708 or other processing location as appropriate for a given implementation, and iterates as described above. In response to determining to report the message resilience propagation of the message, the process 700 creates message propagation information within the presence information within the message presence database that identifies the message and each other MRC device to which the message and the request to deliver the message was propagated for delivery to the target server application on behalf of the message-originating client application at block 768. It is understood that, as described above, the process 700 may determine whether the message presence database is accessible and that for purposes of the present example it is assumed that the message presence database is accessible to reduce complexity and redundancy within the drawing figures. In response to creating the message propagation information at block 768, the process 700 returns to the higher-level processing described in association with FIG. 7A, such as at decision point 708 or other processing location as appropriate for a given implementation, and iterates as described above.

Returning to the description of decision point 708 within FIG. 7A, in response to determining that the local MRC device has previously propagated a message to another peer MRC device for delivery, the process 700 transitions to the processing shown and described in association with FIG. 7D.

FIG. 7D illustrates a third additional portion of example processing associated with the process 700 for automated resilient messaging infrastructure processing. For purposes of the present stage of the present example and to reduce complexity and redundancy within the present example, it is assumed that the local MRC device that originated the message is now currently able to connect to both of the target server application and message presence database.

At decision point 770, the process 700 makes a determination (again based upon the message presence information within the message presence database), as to whether the locally-originated message has already been delivered by another peer MRC device. In response to determining that the message has not already been delivered by another peer MRC device, the process 700 delivers the message to the target server application at block 772. Again, the MRC module 114 that is executing the process 700 may impersonate the message-originating client application to perform the message delivery to the target server application.

At block 774, the process 700 creates (or updates) message presence information within the message presence database that indicates that the message has been delivered and that indicates a time duration for storage of the message presence information. As described above, the time duration for storage of the message presence information after successful delivery and knowledge of the successful message delivery by the message-originating MRC device may provide a configurable and reasonable amount of time for other peer MRC devices to which the message was propagated to determine that the message was successfully delivered.

Returning to the description of decision point 770, in response to determining that the message has already been delivered by a peer MRC device, the process 700 deletes the message presence information from the message presence database at block 776. It should be noted that the processing described in association with a negative determination at decision point 770 is provided to illustrate an alternative form of processing than that described in association with block 774. However, as another alternative, the process 700 may create (or update) message presence information at block 776 within the message presence database that indicates that the message has been delivered and that indicates a time duration for storage of the message presence information rather than deleting the message presence information at block 776.

Continuing with the present example, in response to either creating (or updating) the message presence information at block 774 or deleting the message presence information from the message presence database at block 776, the process 700 notifies the local client application of successful delivery of the propagated message at block 778 and returns to the higher-level processing described in association with FIG. 7A, such as at decision point 702 or other processing location as appropriate for a given implementation, and iterates as described above.

As such, the process 700 processes local message delivery requests from local client applications and message proxy delivery requests from peer MRC devices. The process 700 manages message presence information that may include message propagation information, within a message presence database. Any MRC device within a peer MRC network may impersonate a message-originating client application to deliver a message to a target server application on behalf of the message-originating client application. As such, message delivery may be implemented for client/server-based devices in the absence of client/server connectivity between the message-originating client application and the target server application.

It should be noted that similar and complementary processing may be performed by an MRC module associated with the server device and one or more server applications to facilitate message delivery back to requesting client applications. Sufficient detail is provided within the examples above to teach how such processing may be performed by a server-based MRC device.

As described above in association with FIG. 1 through FIG. 7D, the example systems and processes provide a resilient messaging infrastructure. Many other variations and additional activities associated with a resilient messaging infrastructure are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a first message resilience client device from a second message resilience client device, a message and a request to deliver the message on behalf of a remote client/server-based client application that originated the message to a client/server-based server application that is executed by a server device and that provides outgoing client/server messaging services to the remote client/server-based client application that originated the message;
   storing, in response to determining that delivery of the message as requested on behalf of the remote client/server-based client application to the server device that executes the client/server-based server application is not currently possible via any available connection, the message locally for one of later delivery to the client/server-based server application and propagation of the message with the request to deliver the message to at least one other message resilience client device on behalf of the remote client/server-based client application;
   determining whether message presence information that identifies the locally-stored message exists within a message presence database and indicates whether the locally-stored message has already been delivered to a locally-targeted client/server-based server application;
   in response to determining that the locally-stored message has already been delivered, notifying the local client/server-based client application that the locally-stored message has been successfully delivered and updating the message presence information to indicate a time duration for storage of the message presence information;
   in response to determining that the locally-stored message has not already been delivered, sending, in response to determining that a connection to a locally-targeted server device that executes the locally-targeted client/server-based server application is currently available, the locally-stored message to the locally-targeted client/server-based server application that provides outgoing client/server messaging services to the local client/server-based client application; and
   creating the message presence information that identifies the locally-stored message within the message presence database, that indicates that the locally-stored message has been delivered to the locally-targeted client/server-based server application, and that indicates the time duration for storage of the message presence information by the message presence database.

2. The method of claim 1, further comprising,
   in response to determining that the delivery of the message as requested on behalf of the remote client/server-based client application to the server device that executes the client/server-based server application is currently possible via at least one available connection:
     determining whether message presence information that identifies the message exists within a message presence database and indicates whether the message has already been delivered to the client/server-based server application that provides the outgoing client/server messaging services to the remote client/server-based client application that originated the message; and
   in response to determining that the message presence information that identifies the message exists within the message presence database and indicates that the message has not already been delivered:
     sending the message to the client/server-based server application on behalf of the remote client/server-based client application; and
     updating the message presence information to indicate that the first message resilience client device delivered the message to the client/server-based server application on behalf of the remote client/server-based client application.

3. The method of claim 1, further comprising:
   determining whether message presence information that identifies the message exists within a message presence database;
   in response to determining that the message presence information that identifies the message does not exist within the message presence database:
     creating message presence information within the message presence database that identifies the message and message propagation information within the created message presence information that indicates to other message resilience client devices that the first message resilience client device is operating as a message resilience proxy client device for the second message resilience client device to attempt to deliver the message to the client/server-based server application on behalf of the remote client/server-based client application; and
   in response to determining that the message presence information that identifies the message exists within the message presence database:
     creating message propagation information within the message presence information that indicates to the other message resilience client devices that the first message resilience client device is operating as the message resilience proxy client device for the second message resilience client device to attempt to deliver the message to the client/server-based server application on behalf of the remote client/server-based client application.

4. The method of claim 1, further comprising:
   determining whether an alternative connection to any other message resilience client device is available; and propagating, to at least one other message resilience client device to which the alternative connection is determined to be available, the message and the request to deliver the message to the client/server-based server application on behalf of the remote client/server-based client application.

5. The method of claim 4, further comprising:
determining whether message presence information that identifies the message exists within a message presence database;
in response to determining that the message presence information that identifies the message does not exist within the message presence database:
   creating message presence information within the message presence database that identifies the message and message propagation information within the created message presence information that identifies each other message resilience client device to which the message and the request to deliver the message is propagated; and
in response to determining that the message presence information that identifies the message exists within the message presence database:
   creating message propagation information within the message presence information that identifies each other message resilience client device to which the message and the request to deliver the message is propagated.

6. A system, comprising:
a memory; and
a processor programmed to:
receive, at a first message resilience client device from a second message resilience client device, a message and a request to deliver the message on behalf of a remote client/server-based client application that originated the message to a client/server-based server application that is executed by a server device and that provides outgoing client/server messaging services to the remote client/server-based client application that originated the message;
store, in response to determining that delivery of the message as requested on behalf of the remote client/server-based client application to the server device that executes the client/server-based server application is not currently possible via any available connection, the message locally in the memory for one of later delivery to the client/server-based server application and propagation of the message with the request to deliver the message to at least one other message resilience client device on behalf of the remote client/server-based client application;
determining whether message presence information that identifies the locally-stored message exists within a message presence database and indicates whether the locally-stored message has already been delivered to a locally-targeted client/server-based server application;
in response to determining that the locally-stored message has already been delivered, notifying the local client/server-based client application that the locally-stored message has been successfully delivered and updating the message presence information to indicate a time duration for storage of the message presence information;
in response to determining that the locally-stored message has not already been delivered, sending, in response to determining that a connection to a locally-targeted server device that executes the locally-targeted client/server-based server application is currently available, the locally-stored message to the locally-targeted client/server-based server application that provides the outgoing client/server messaging services to the local client/server-based client application; and
creating the message presence information that identifies the locally-stored message within the message presence database, that indicates that the locally-stored message has been delivered to the locally-targeted client/server-based server application, and that indicates the time duration for storage of the message presence information by the message presence database.

7. The system of claim 6, where the processor is further programmed to,
in response to determining that the delivery of the message as requested on behalf of the remote client/server-based client application to the server device that executes the client/server-based server application is currently possible via at least one available connection:
   determine whether message presence information that identifies the message exists within a message presence database and indicates whether the message has already been delivered to the client/server-based server application that provides the outgoing client/server messaging services to the remote client/server-based client application that originated the message; and
in response to determining that the message presence information that identifies the message exists within the message presence database and indicates that the message has not already been delivered:
   send the message to the client/server-based server application on behalf of the remote client/server-based client application; and
   update the message presence information to indicate that the first message resilience client device delivered the message to the client/server-based server application on behalf of the remote client/server-based client application.

8. The system of claim 6, where the processor is further programmed to:
determine whether message presence information that identifies the message exists within a message presence database;
in response to determining that the message presence information that identifies the message does not exist within the message presence database:
   create message presence information within the message presence database that identifies the message and message propagation information within the created message presence information that indicates to other message resilience client devices that the first message resilience client device is operating as a message resilience proxy client device for the second message resilience client device to attempt to deliver the message to the client/server-based server application on behalf of the remote client/server-based client application; and
in response to determining that the message presence information that identifies the message exists within the message presence database:
   create message propagation information within the message presence information that indicates to the other message resilience client devices that the first message resilience client device is operating as the message resilience proxy client device for the second message resilience client device to attempt to deliver the message to the client/server-based server application on behalf of the remote client/server-based client application.

9. The system of claim 6, where the processor is further programmed to:
   determine whether an alternative connection to any other message resilience client device is available; and
   propagate, to at least one other message resilience client device to which the alternative connection is determined to be available, the message and the request to deliver the message to the client/server-based server application on behalf of the remote client/server-based client application.

10. The system of claim 9, where the processor is further programmed to:
    determine whether message presence information that identifies the message exists within a message presence database;
    in response to determining that the message presence information that identifies the message does not exist within the message presence database:
       create message presence information within the message presence database that identifies the message and message propagation information within the created message presence information that identifies each other message resilience client device to which the message and the request to deliver the message is propagated; and
    in response to determining that the message presence information that identifies the message exists within the message presence database:
       create message propagation information within the message presence information that identifies each other message resilience client device to which the message and the request to deliver the message is propagated.

11. A computer program product, comprising:
    a non-transitory computer readable storage medium having computer readable program code embodied therewith, where the computer readable program code when executed on a computer causes the computer to:
    receive, at a first message resilience client device from a second message resilience client device, a message and a request to deliver the message on behalf of a remote client/server-based client application that originated the message to a client/server-based server application that is executed by a server device and that provides outgoing client/server messaging services to the remote client/server-based client application that originated the message;
    store, in response to determining that delivery of the message as requested on behalf of the remote client/server-based client application to the server device that executes the client/server-based server application is not currently possible via any available connection, the message locally for one of later delivery to the client/server-based server application and propagation of the message with the request to deliver the message to at least one other message resilience client device on behalf of the remote client/server-based client application;
    determining whether message presence information that identifies the locally-stored message exists within a message presence database and indicates whether the locally-stored message has already been delivered to a locally-targeted client/server-based server application;
    in response to determining that the locally-stored message has already been delivered, notifying the local client/server-based client application that the locally-stored message has been successfully delivered and updating the message presence information to indicate a time duration for storage of the message presence information;
    in response to determining that the locally-stored message has not already been delivered, sending, in response to determining that a connection to a locally-targeted server device that executes the locally-targeted client/server-based server application is currently available, the locally-stored message to the locally-targeted client/server-based server application that provides the outgoing client/server messaging services to the local client/server-based client application; and
    creating the message presence information that identifies the locally-stored message within the message presence database, that indicates that the locally-stored message has been delivered to the locally-targeted client/server-based server application, and that indicates the time duration for storage of the message presence information by the message presence database.

12. The computer program product of claim 11, where the computer readable program code when executed on the computer further causes the computer to,
    in response to determining that the delivery of the message as requested on behalf of the remote client/server-based client application to the server device that executes the client/server-based server application is currently possible via at least one available connection:
       determine whether message presence information that identifies the message exists within a message presence database and indicates whether the message has already been delivered to the client/server-based server application that provides the outgoing client/server messaging services to the remote client/server-based client application that originated the message; and
    in response to determining that the message presence information that identifies the message exists within the message presence database and indicates that the message has not already been delivered:
       send the message to the client/server-based server application on behalf of the remote client/server-based client application; and
       update the message presence information to indicate that the first message resilience client device delivered the message to the client/server-based server application on behalf of the remote client/server-based client application.

13. The computer program product of claim 11, where the computer readable program code when executed on the computer further causes the computer to:
    determine whether message presence information that identifies the message exists within a message presence database;
    in response to determining that the message presence information that identifies the message does not exist within the message presence database:
       create message presence information within the message presence database that identifies the message and message propagation information within the created message presence information that indicates to other message resilience client devices that the first message resilience client device is operating as a message resilience proxy client device for the second message resilience client device to attempt to deliver the message to the client/server-based server application on behalf of the remote client/server-based client application; and in response to determining that the message presence information that identifies the message exists within the message presence database:
   create message propagation information within the message presence information that indicates to the other message resilience client devices that the first message resilience client device is operating as the message resilience proxy client device for the second message resilience client device to attempt to deliver the message to the client/server-based server application on behalf of the remote client/server-based client application.

14. The computer program product of claim 11, where the computer readable program code when executed on the computer further causes the computer to:
   determine whether an alternative connection to any other message resilience client device is available; and
   propagate, to at least one other message resilience client device to which the alternative connection is determined to be available, the message and the request to deliver the message to the client/server-based server application on behalf of the remote client/server-based client application.

15. The computer program product of claim 14, where the computer readable program code when executed on the computer further causes the computer to:
   determine whether message presence information that identifies the message exists within a message presence database;
   in response to determining that the message presence information that identifies the message does not exist within the message presence database:
      create message presence information within the message presence database that identifies the message and message propagation information within the created message presence information that identifies each other message resilience client device to which the message and the request to deliver the message is propagated; and
   in response to determining that the message presence information that identifies the message exists within the message presence database:
      create message propagation information within the message presence information that identifies each other message resilience client device to which the message and the request to deliver the message is propagated.

* * * * *